US005634397A

United States Patent [19]
Hutchinson et al.

[11] Patent Number: 5,634,397
[45] Date of Patent: *Jun. 3, 1997

[54] EGG WASHER, BREAKER AND SEPARATOR SYSTEM

[75] Inventors: Mark R. Hutchinson, Topeka; Eugene A. Redding, Olathe; Anatoliy V. Grushanskiy, Lenexa; Norman B. Guy, Topeka, all of Kans.

[73] Assignee: Seymour Foods, Inc., Topeka, Kans.

[*] Notice: The term of this patent shall not extend beyond the expiration date of Pat. No. 5,460,083.

[21] Appl. No.: 546,656

[22] Filed: Oct. 23, 1995

Related U.S. Application Data

[63] Continuation of Ser. No. 181,991, Jan. 14, 1994, Pat. No. 5,460,083.

[51] Int. Cl.$^6$ ............... A23J 1/09; A47J 43/14; A01K 43/00
[52] U.S. Cl. ............... 99/484; 99/498; 99/500; 15/3.13; 15/3.14; 15/3.16; 15/3.17; 15/88.2; 134/131; 198/779
[58] Field of Search ............... 15/3.1–3.21, 88.2, 15/88.3, 4; 99/484, 497–500; 134/131; 198/779

[56] References Cited

U.S. PATENT DOCUMENTS

| | | | |
|---|---|---|---|
| 709,562 | 9/1902 | Swan et al. | 15/3.16 |
| 755,937 | 3/1904 | Richardson et al. | 15/3.21 |
| 1,776,784 | 9/1930 | Cramer | 15/3.13 |
| 1,970,032 | 8/1934 | Conlee | 15/3.15 |
| 1,999,817 | 4/1935 | Martin | 134/131 |
| 2,207,330 | 7/1940 | Osburn | 15/201 |
| 2,539,432 | 1/1951 | Jones | 134/131 |
| 2,555,193 | 5/1951 | Johnson | 15/3.14 |
| 3,097,382 | 7/1963 | Angle | 15/3.13 |
| 3,155,102 | 11/1964 | Niederer, Jr. et al. | 198/779 |
| 3,296,641 | 1/1967 | Rose et al. | 15/3.13 |
| 3,480,056 | 11/1969 | Willsey | 99/498 |
| 4,111,111 | 9/1978 | Willsey | 99/499 |
| 4,321,864 | 3/1982 | Willsey | 99/500 |
| 4,534,284 | 8/1985 | Fujimura et al. | 99/498 |
| 4,764,387 | 8/1988 | Willsey | 426/299 |
| 4,773,322 | 9/1988 | Willsey | 99/499 |

OTHER PUBLICATIONS

Sales literature of Sanovo Engineering A/S of Denmark on SANOVO 6000 Egg Breaking Separating System published prior to Jan. 14, 1994.

*Primary Examiner*—Mark Spisich
*Attorney, Agent, or Firm*—Litman, McMahon and Brown, L.L.P.

[57] ABSTRACT

An improved egg washing, breaking and separating system is constructed of two side-by-side washers feeding a corresponding pair of candlers. From the candlers, a respective pair of conveyor transition ramps lead to corresponding ones of a pair of stacked upper and lower egg breaker/separator units. Each egg breaker/separator unit includes an endless chain of a plurality of individual egg cracker/separator cup assemblies with the upper chain independently driven about a four sided frame, preferably in opposition to the lower chain. Eggs are shuttled into the cup assemblies from each of the conveyor transition ramps. The chains of cracker/separator cup assemblies ride via slides operating within tracks extending about the frame. Each washer allows rows of eggs to advance along an egg conveyor which travels beneath a plurality of endless chains of brushes as well as a cleaning water distribution manifold. Each chain of brushes is driven in a direction opposite from the brush chains on either side, resulting in a very thorough cleaning of the rows of eggs advancing through each washer.

28 Claims, 20 Drawing Sheets

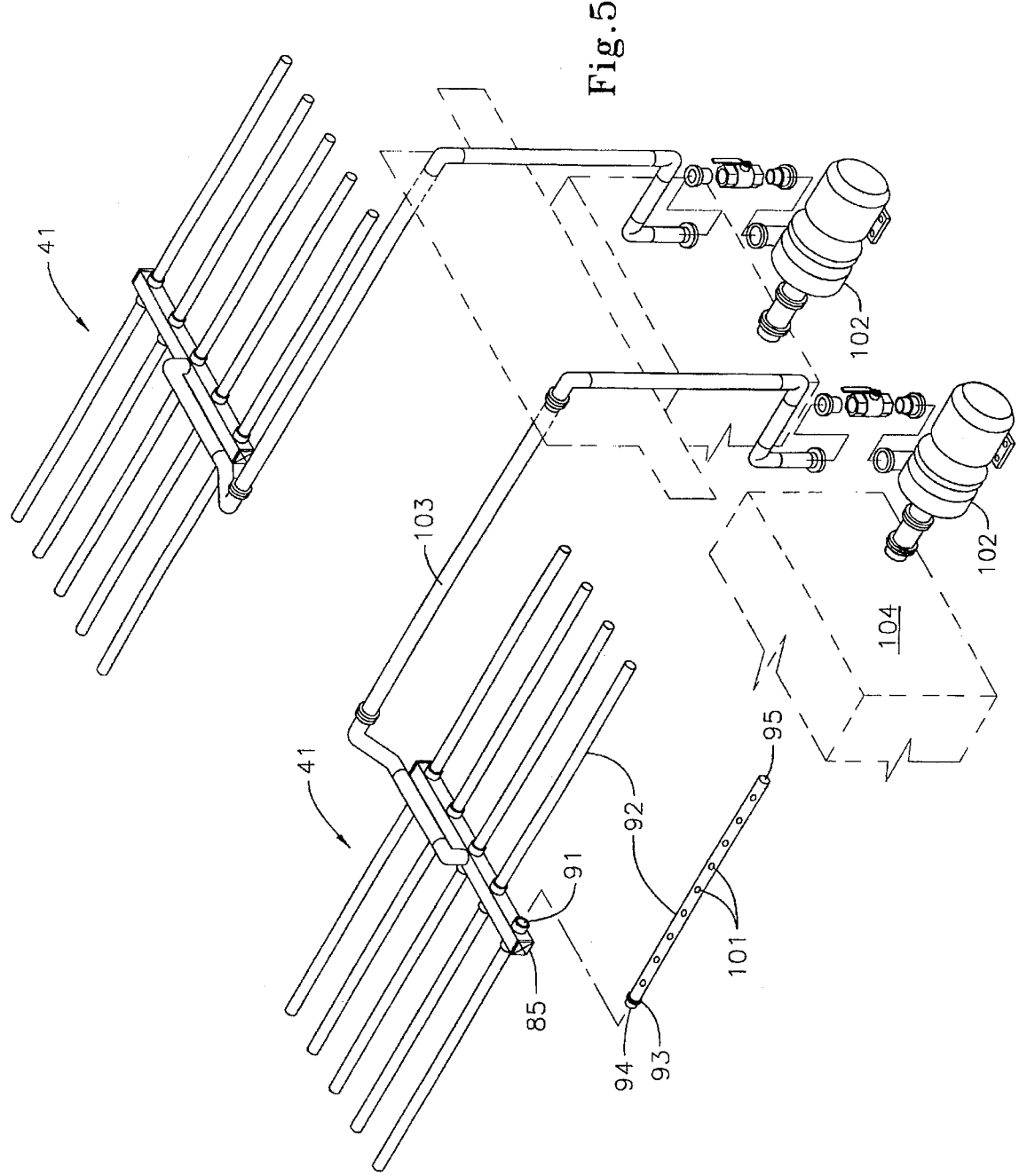

EGG WASHER, BREAKER AND SEPARATOR SYSTEM

CROSS REFERENCE TO RELATED APPLICATIONS

This application is a continuation of application Ser. No. 08/181,991, entitled IMPROVED EGG WASHING, BREAKING AND SEPARATING SYSTEM filed Jan. 14, 1994, now U.S. Pat. No. 5,460,083, issued Oct. 24, 1995.

BACKGROUND OF THE INVENTION

1. Field of the Invention

The present invention relates generally to an improved combination egg washer, breaker and separator system in which rows of eggs are conveyed through a washing apparatus, through an egg candler, and then transferred onto a breaking and separating apparatus. More particularly it relates to such a system in which the washer apparatus is comprised of two side-by-side, independently driven washers through which rows of eggs are driven on separate conveyors, with each conveyor then feeding the eggs through a respective separate candler and to a transfer mechanism via respective up and down inclined ramps. The up ramp conveyor feeds eggs to an upper egg breaker/separator unit while the down ramp feeds eggs to a lower, counter-rotating egg breaker/separator unit.

2. Description of the Related Art

At least since the turn of the century, specialized commercial egg processors have processed large numbers of eggs to yield separated egg product for the food industry. Through the 1940's, such egg breaking and separation was done manually by large numbers of workers who stood at individual stations breaking and separating individual eggs. Advances in technology in the 1950's resulted in mechanized systems which could break and separate eggs in large numbers.

These systems have gradually evolved to modem versions in which certain machines are capable of washing, breaking and separating up to 100 cases of eggs per hour, with a case of eggs constituting 360 eggs. Typically, these prior art large systems require four people to operate them, i.e. two person operating the mechanized loader, one person observing the candler, and one person operating the breaker and separator. Each system takes up a considerable amount of floor space within a production facility with the attendant costs associated therewith. In addition, typical prior art systems have egg product loss ratios approaching 10%, i.e. as much as 10% of the egg weight, after the weight of discarded shells is subtracted, is lost between the entry point and the product collection point. This loss occurs from a number of factors such as eggs broken prematurely, eggs dropped between the transfer mechanism and the egg breaker, eggs thrown from the breaker, egg yolks broken by the separator, etc. A representative prior art system is shown and described in Willsey U.S. Pat. No. 3,480,056, granted Nov. 25, 1969, and entitled "EGG BREAKING MACHINE" (the '056 patent).

It is clear then, that a need exists for an improved egg washing, breaking and separating system which achieves an enhanced throughput of eggs, uses proportionately fewer personnel to run and occupies proportionately less floor space than existing prior art systems. In addition, such an improved system should preferably include an egg washer which utilizes improved brushes and brush action for enhanced cleaning results. The egg breaker and separator should be designed for longer life with reduced wear and for ease of cleaning.

SUMMARY OF THE INVENTION

In the practice of the present invention, an improved egg washing, breaking and separating system is constructed of two essentially independent, side-by-side washers feeding a corresponding pair of candlers. From the candlers, a respective pair of conveyor inclined ramps lead to corresponding ones of a pair of stacked upper and lower egg breaker/separator units. Each of the upper and lower egg breaker/separator units includes an endless chain of individual egg cracker/separator cup assemblies. The endless chain of cup assemblies in the upper egg breaker/separator unit is driven in a direction opposite to the chain in the lower breaker/separator unit. From each of the conveyor inclined ramps, eggs are placed in rows onto an egg shuttle which, in turn, drops one egg into each individual egg cracker/separator cup of the corresponding chain. Prior to dropping the current row of eggs into the cup assemblies, the shuttle is accelerated in the direction of the moving chain to a pace at which the shuttle and chain are momentarily moving at approximately the same speed, at which point the shuttle rotates to drop the eggs onto cradles within the chain. The relative positions of the shuttle and the chain of egg cracker/separator cup assemblies are adjustable.

The upper and lower egg breaker/separator units are both attached to a four sided frame about which each corresponding endless chain of cup assemblies is driven, albeit in opposite directions. The front or loading side of the frame is wider than the rear frame side such that the side walls taper inward from front to back. With this configuration, upper and lower operators can be efficiently positioned between adjacent systems. In addition, each egg shuttle is positioned near a respective end of the longer loading side such that eggs transferred from the shuttle to the individual egg cracker/separator cup assemblies have most of the longer length of the loading side to settle down before the chain turns the first corner where the breaking and separating operations commence. This longer settling time results in reduced waste as fewer eggs are dropped or thrown from the egg breaking cradles in transiting the first corner. In order to reduce wear and parts replacement requirements, the chains of cracker/separator assemblies ride via slides operating within tracks extending about the frame. This contrasts with prior art systems, such as the '056 patent, where multiple castering rollers, a source of undesirable wear, chatter and vibration, are used to support each chain as it traverses the frame. Both of the upper and lower breaker/separator units are driven by independent and speed controllable drive motors, and can thus be run at different speeds, or, indeed, one unit can be run while the other is shut off. This flexibility allows for efficient training of operators on one unit, for example, while experienced operators run the other unit at a higher speed.

Each washer allows for rows of eggs to advance along an egg conveyor which travels beneath a plurality of endless chains of brushes as well as a cleaning water distribution manifold. On each side of the washer is a drive shaft which is independently driven by a speed controllable hydraulic motor. The two shafts in each washer are driven in counter rotating directions. A plurality of sprockets are attached to each drive shaft, with the sprockets arranged in pairs. Each pair of sprockets includes a drive sprocket on one shaft and an idler sprocket on the other shaft. Each pair of sprockets supports and drives a corresponding one of the endless chains of brushes. Along each shaft, the drive and idler sprockets are alternated, with the net effect being that each successive endless chain of brushes is driven in a direction opposite from the adjacent brush chains on either side. This brush action results in a very thorough cleaning of the rows of eggs advancing through each washer.

Furthermore, the improved stacked upper and lower egg breaker/separator units along with the double washer and candler systems and a mechanized loader (not shown) can all be run by a total of five employees while permitting eggs to be throughput over twice as fast as prior art systems utilizing four employees each.

OBJECTS AND ADVANTAGES OF THE PRESENT INVENTION

The objects and advantages of the present invention include: providing an improved egg washing, breaking and separating system; providing such a system in which a pair of conveyors feed rows eggs through a corresponding pair of washers and then convey the washed eggs through a pair of candlers to a pair of inclined ramps; providing such a system in which the eggs are loaded from the ramps onto a corresponding pair of egg breaker/separator units; providing such a system in which the breaker/separator unit chains are stacked upper and lower units with the corresponding inclined ramps being inclined upward and downward, respectively; providing such a system in which the rows of eggs are loaded from each inclined ramp to a corresponding shuttle, from which the eggs are loaded onto individual cracker/separator cup assemblies in an endless chain of such cup assemblies in each of the upper and lower breaker/separator units; providing such a system in which the endless chains of cup assemblies in the upper and lower breaker/separator units are independently driven in respective counter-rotating directions about a four sided frame; providing such a system in which the upper and lower units can be independently speed controlled to permit maximum production flexibility; providing such a system in which the four sided frame has a front or loading side longer than a rear side; providing such a system in which eggs are introduced near one end of the longer loading side which allows them an increased time to settle in cradles prior to the breaking operation; providing such a system in which each washer is equipped with a plurality of driven endless chains of brushes, with each successive chain driven in a direction opposite to the brush chains on either side of it; providing such a system in which the washers include a cleaning fluid distributing manifold which is easily disassembled for cleaning; providing such a system in which the cup assembly chains are supported for rotation by a slider and track system which minimizes wear and tear of component parts; and providing such a system which is efficient in operation, requires reduced manpower for operation, is capable of a long operating life and is particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 5 is an enlarged perspective assembly view of the double washer cleaning fluid spray system with one of the perforated spray tubes removed from one of the main spray distribution tubes.

DETAILED DESCRIPTION OF THE PREFERRED EMBODIMENTS

I. Introduction and Environment

Figure 1:
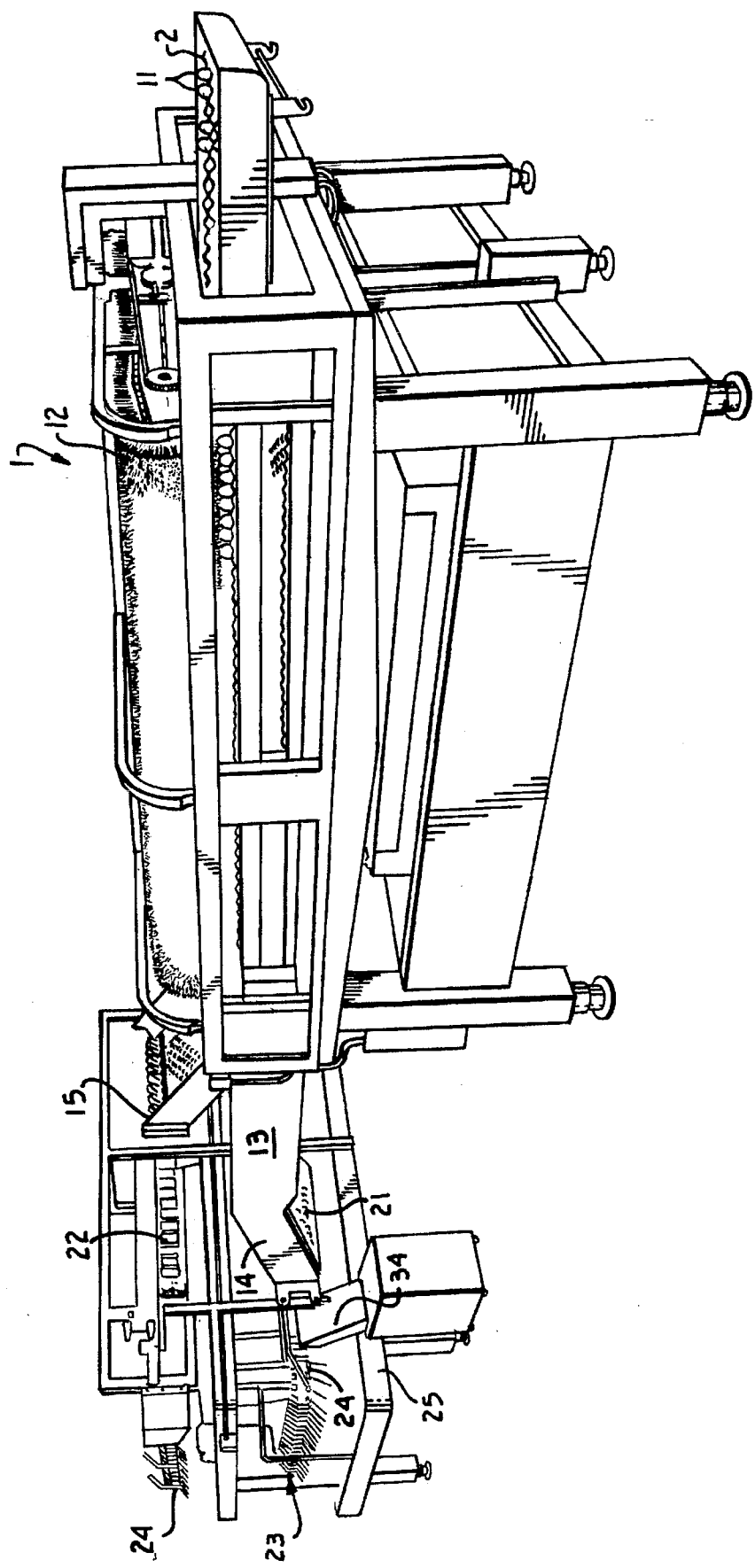
FIG. 1 is a perspective view of an improved egg washing, breaking and separating system in accordance with the present invention.

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "up", "down", "right" and "left" will refer to directions in the drawings to which reference is made. The words "in" and "out" will refer to directions toward and away from, respectively, the geometric center of the structure being referred to, and the words "clockwise" and "counter clockwise" are from the perspective of the drawing figure being referenced. Said terminology will include the words specifically mentioned derivatives thereof and words of similar import.

Figure 3:
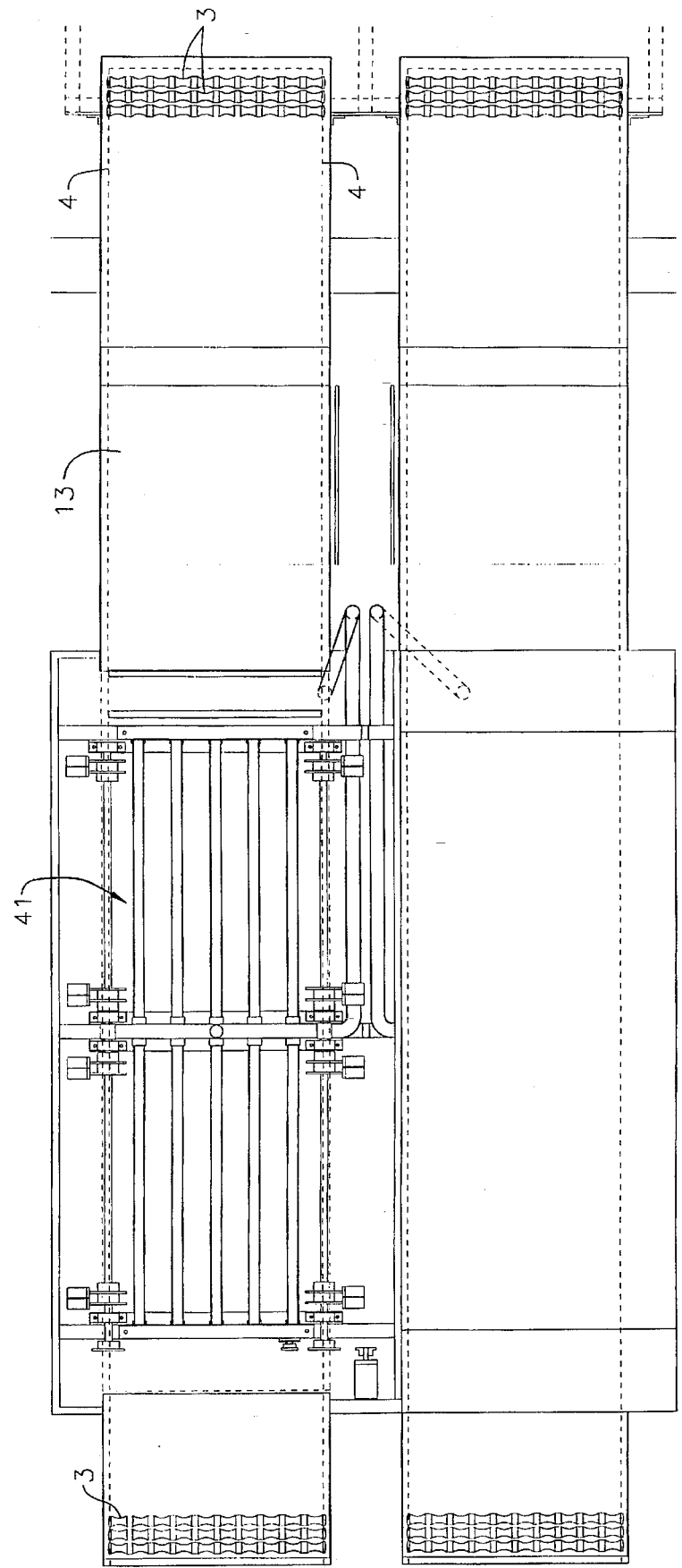
FIG. 3 is an enlarged, partially schematic top plan view of the egg washer, candler and inclined ramp conveyor, illustrating the placement of a cleaning fluid spray manifold.

Referring to the drawings in more detail, reference numeral 1 in FIG. 1 generally designates a double egg washer apparatus with a pair of egg conveyors 2, of which only the closest conveyor is illustrated for simplicity. Each conveyor 2 includes a conventional series of egg conveying rollers 3 (FIG. 3), which are rotatably attached to a pair of endless chains 4, one on either side of each roller 3. The thus interconnected rollers 3 form an endless loop as they roll over a surface 5 while supporting rows of eggs 11, one row of eggs being supported between each successive pair of rollers 3. The eggs 11 are loaded onto each conveyor 2 from a high speed mechanized egg loader (not shown) which does not form a part of the present invention. As the rollers 3 traverse the surface 5, their rolling action imparts a rolling action to the eggs 11, thus efficiently presenting all sides of each egg to a plurality of brush chains 12 for cleaning, in a novel brushing action which will be described with particularity below.

Figure 9:
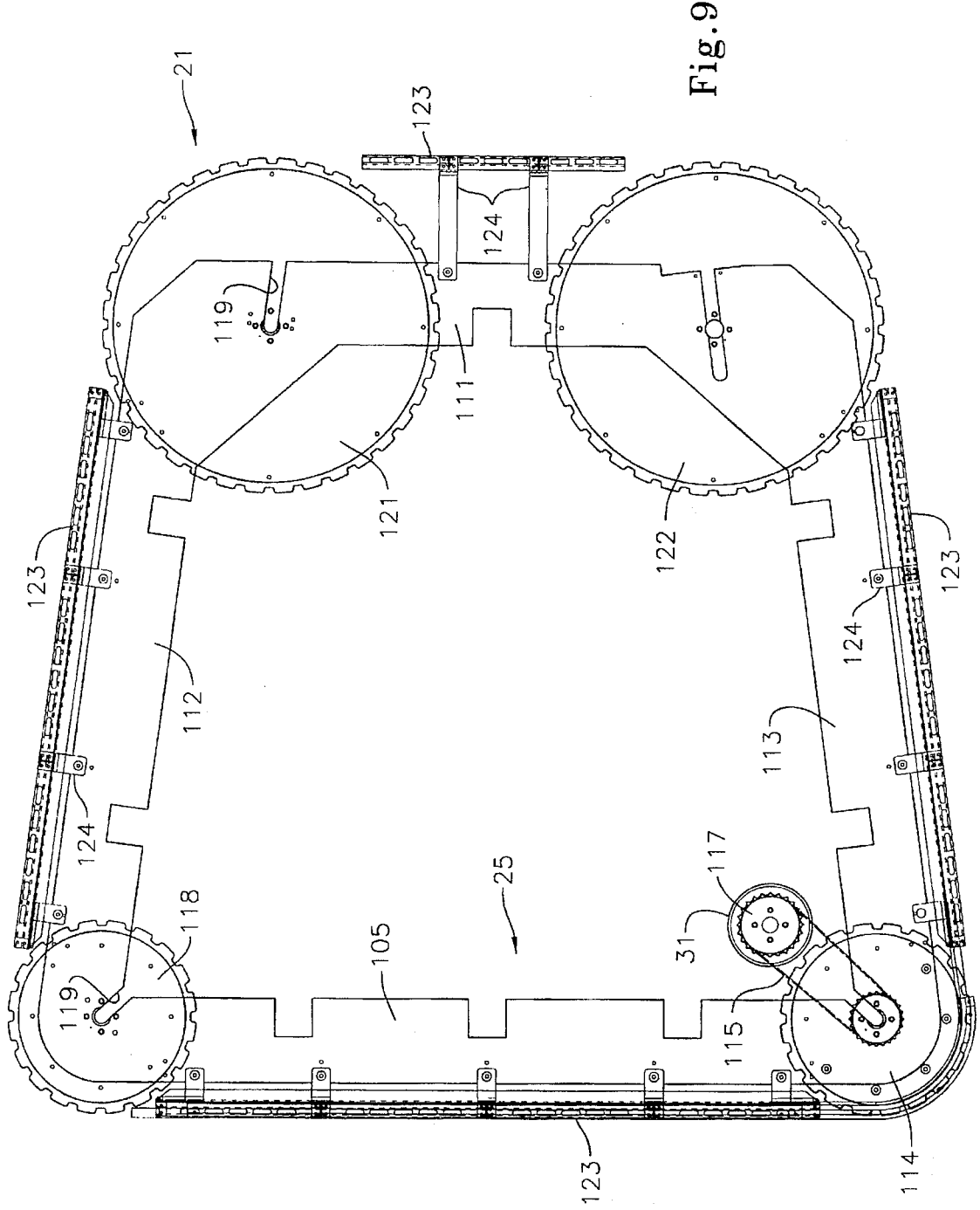
FIG. 9 is an enlarged, partially schematic top plan view of the egg breaking and separating system illustrating the shape of the frame and the sizes of the drive and idler rollers of one of the lower egg breaker/separator unit.

Referring again to FIG. 1, the rows of eggs 11 on each conveyor 2 are carried past the washers 1 to a corresponding pair of conventional egg candlers 13, in which candlers 13 light from a bank of fluorescent light bulbs (not shown) is directed through the washed eggs 11 so that an observer can detect and discard rotten or otherwise contaminated eggs. From the candlers 13, the conveyors 2 end in a respective pair of inclined ramps 14 and 15, with the ramp 14 being inclined downward from the level of the candler 13 while the ramp 15 is inclined upward from the same level. As is shown on an underneath side 21 of the inclined ramp 14, the egg conveying rollers 3 return beneath the ramp 14, egg candler 13 and through the washer 1 to form the previously described endless conveyor loop with a similar return (not shown) occurring beneath ramp 15. From the inclined ramps 14 and 15, eggs are loaded onto an egg breaking and separating apparatus, generally indicated at 21, including respective stacked upper and lower egg breaker/separator units 22 and 23. Each of the upper and lower egg breaker separators 22 and 23 includes an endless chain of egg cracker/separator cup assemblies 24 (better illustrated in FIGS. 23–25), which are driven in respective endless loops about a four sided frame 25 by individual, independent and speed controllable drive motors 31 (FIG. 9). The upper drive motor 31 drives the upper egg breaker/separator unit 22 in a clockwise direction about the frame 25, as viewed from above, while the lower motor 31 drives the lower egg breaker/separator unit 23 in an opposite or counter clockwise direction about the frame 25.

As will be explained in more detail below, each egg cracker/separator cup assembly 24 in the upper and lower breaker/separator units 22 and 23 receives an individual egg 11 from the respective conveyor ramp 14 or 15 with each rotation of the frame. Subsequent to receiving the egg, and at different stages of its revolution about the frame 25, each assembly 24 sequentially cracks the egg and opens the shell to drop the contents into a separating cup 214 (FIG. 20), where the egg yolk and egg white or albumen are separated. The egg white drains into a tray 215 and, subsequently, the separated egg yolk and egg white are separately off loaded, the broken shell discarded via an egg shell chute 34, each assembly is then positioned to receive the next egg 11 to start the process again. Although these steps are common to many prior art egg breaking and separating systems, the present system includes a number of significant improvements which have improved egg cleaning efficiency, throughput and operating speed, as will be explained below.

II. Egg Washer Apparatus

Figure 2:
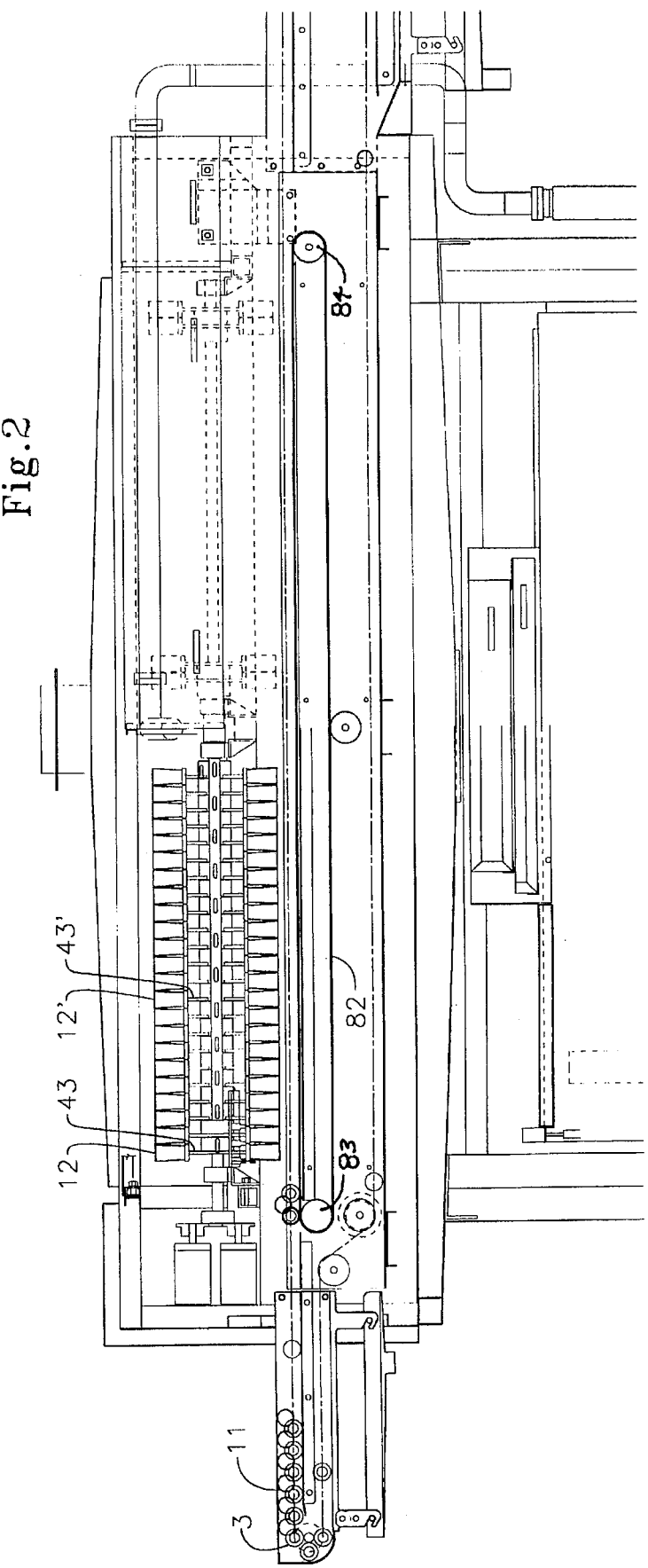
FIG. 2 is an enlarged, partially schematic side elevational view of the egg washer, candler and inclined ramp conveyor, illustrating the brush chain arrangement.
Figure 4:
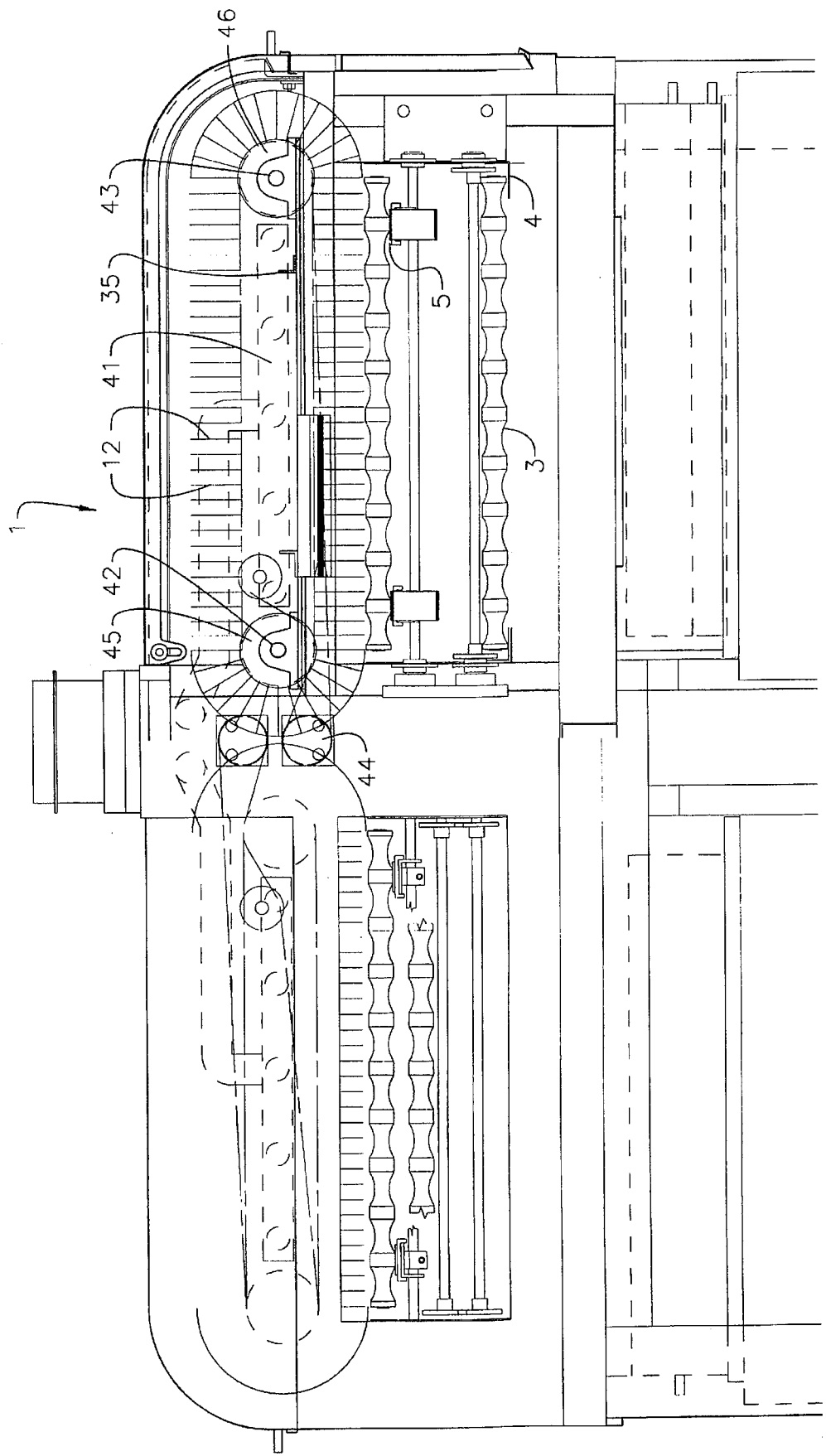
FIG. 4 is an enlarged, partially schematic end elevational view of the double egg washer, with a plurality of conveyor rollers removed to illustrate a conveyor roller drive belt, with a brush chain shown in solid lines and the spray manifold shown in phantom lines and with portions of a leftmost conveyor broken away to illustrate the interior thereof.

Referring again to FIG. 1 and more particularly to FIGS. 2–8, each side of the egg washer apparatus 1 is a mirror image of the other, and like elements in each side will be numbered the same. Each brush side includes a plurality of the individual endless brush chains 12, with each such brush chain 12 being driven in an endless loop around a brush support frame 35 (FIG. 4) and a cleaning fluid spray manifold 41. The brush chains 12 also encircle a pair of drive shafts 42 and 43 which are collectively belt or chain driven via a hydraulic motor 44, but in counter rotating directions, i.e. the shaft 42 is driven counter clockwise in FIG. 4 while the shaft 43 is driven clockwise. Referring to FIG. 4, and to FIG. 2, in which the drive shaft 43 is shown in cross-section, each endless brush chain 12 encircles a pair of sprockets 45 and 46 which sprockets 45 and 46 drive the respective brush chain 12 in its endless loop. However, the sprockets 45 and 46 along the respective shafts 42 and 43 alternate between drive sprockets and idler sprockets, i.e., referring to FIG. 8, the sprocket 45 is rigidly attached to the drive shaft 42 via a keyway 51, key 52 and set screw 53, as shown in phantom lines. By contrast, the equivalent sprocket 46 on the shaft 43 is not rigidly attached and is thus free to rotate about the shaft 43. Thus, again referring to FIG. 4, the first brush chain 12 is driven counter clockwise by the sprocket 45 and the idler sprocket 46 merely rotates freely. Referring to FIG. 2, the next sprocket 46, here labeled as 46', is rigidly attached to the drive shaft 43 while the opposite sprocket 45 (not shown in FIG. 2) is an idler sprocket which is free to rotate about the shaft 42. The sprockets 46 and 46' thus alternate along the shaft 43 between drive sprockets and idler sprockets with the net effect being that each of the brush chains 12 in FIG. 2 rotate clockwise (from the viewing angle of FIG. 4) while each of the brush chains 12' rotate counter clockwise. This provides an extremely effective back and forth brushing action by the brush chains 12 and 12', resulting in a thorough cleaning of the eggs 11. Although not shown in the drawings, the drive shafts 42 and 43 can be raised or lowered to change the pressure exerted on eggs 11 transiting the washer 1 by the brush chains 12. With this arrangement, when eggs to be processed are fairly clean, the brush chains 12 can be raised to minimize breakage of eggs due to brush pressure. Similarly, the speed of the hydraulic motor 44 is widely variable, which allows different brush speeds, again with the effect of varying brush pressure on the eggs 11.

Figure 7:
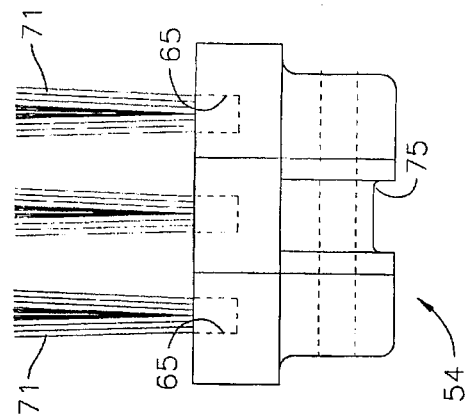
FIG. 7 is a greatly enlarged end elevational view of the single brush holding plate of FIG. 6, with brush bristles inserted into bristle receiving cavities which are shown in phantom lines.
Figure 6:
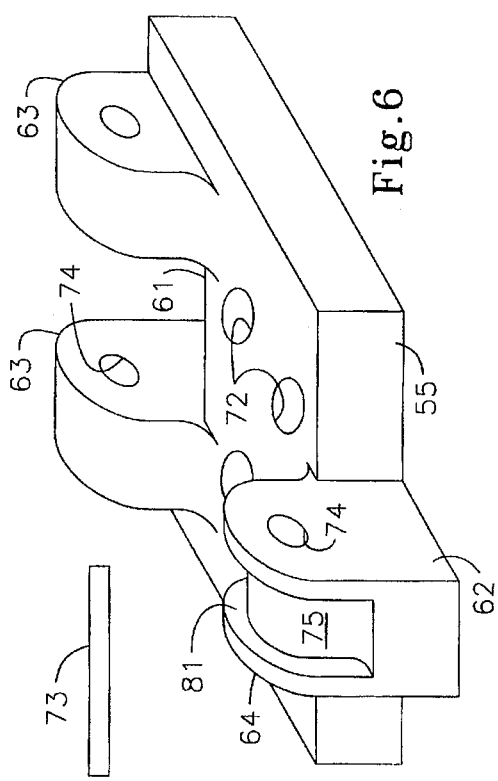
FIG. 6 is a greatly enlarged perspective view of a single brush holding plate and chain link from one of the endless brush chains of the egg washer.
Figure 8:
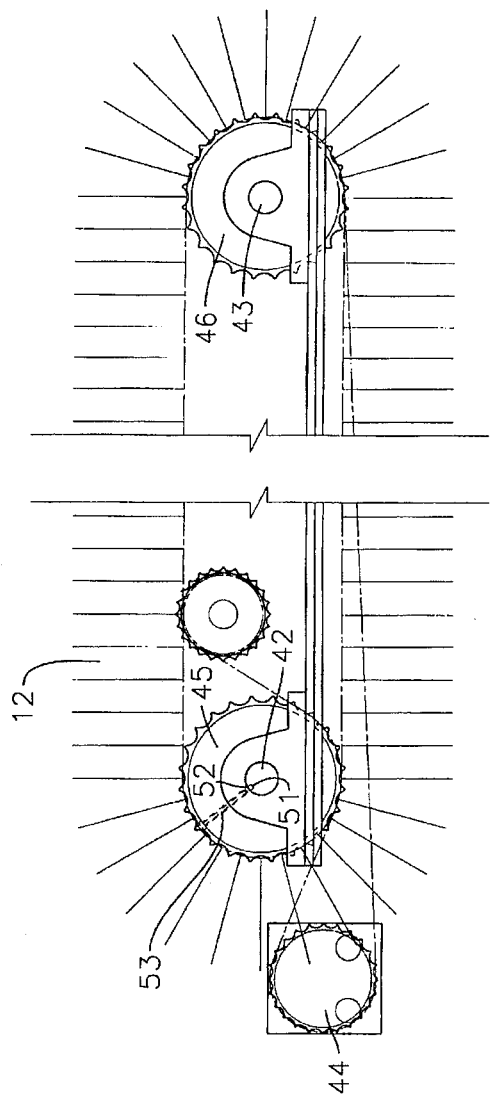
FIG. 8 is an enlarged, partial front elevational view of a brush chain with drive and idler sprockets and drive shafts, illustrating the rigid connection of the drive sprocket and the idling connection of the idler sprocket to their respective drive shafts.

Referring to FIGS. 6 and 7, each of the brush chains 12 and 12' is made up of a series of interconnected brush links 54, of which one is illustrated. Each brush link 54 includes a rectangular plate 55 with a slot 61 on one end thereof and an extension 62 on the other end thereof, with the extension 62 being sized to fit within the slot 61 of the next brush link 54. A pair of clevises 63 are positioned on either side of the slot 61 and extend upward from the surface of the plate 55. Likewise, a single clevis 64 is positioned on the extension 62. A plurality of bristle receiving cavities 65 extend partially through the plate 55 and each cavity 65 receives a number of bristles 71 which are secured therein. In addition, a number of apertures 72 extend entirely through the plate 55 to eliminate excess weight and to provide inlets for cleaning fluid. To form a brush chain, the individual brush links 54 are attached together by inserting the extension 62 of one link 54 into the slot 61 of the next link 54 and inserting pins 73 through bores 74 in the clevises 63 and 64. In addition to the connecting function performed by each clevis 64, a curved indentation 75 is surrounded by a pair of sidewalls 81. The indentations 75 of each brush chain 12 engage individual teeth (FIG. 8) in each sprocket 45 and 46 as the chain 12 is looped over the sprockets 45 and 46.

Referring again to FIGS. 2 and 4, a pair of conveyor roller acceleration belts 82 (of which one is visible in FIG. 2) extend in an endless loop about drive pulleys 83 and idler pulleys 84. The belts 83 are driven in a counter clockwise direction (FIG. 2) and are in contact with the bottom portions of the egg rollers 3 to accelerate the rotation of the egg rollers 3. This has the effect of spinning the eggs 11 at a faster rate to provide an enhanced cleaning action by the brush chains 12 and 12'.

The cleaning fluid spray manifolds 41 are better illustrated in FIG. 5. Each spray manifold 41 includes a central square fluid distributing tube 85 with a plurality of spray pipe receiving flanges 91 arrayed on either side thereof which flanges 91 are open to the interior of the distributing tube 85. A like plurality of spray pipes 92 are removably attachable to corresponding ones of said flanges 91. Each spray pipe 92 has an O ring 93 surrounding an open end 94 thereof, which O ring functions to seal the connection between the open end 94 of each spray pipe 92 with its corresponding flange 91. An opposite end 95 of each spray pipe 92 is closed and a plurality of spray orifices 101 are arrayed along the bottom of each spray tube 92. Note that the spray pipe 92 which is removed from the distributing tube 85 is rotated 180 degrees to illustrate the orifices 101. The easy removal of the spray pipes 92 from the flanges 91 facilitates cleaning of and parts replacement within the spray manifold 41. Each spray distributing tube 85 is connected to a cleaning fluid spray pump 102 via a series of pipes 103. Each pump 102 is connected to a cleaning fluid reservoir 104 to thereby pump cleaning fluid (generally water with certain additives such as anti-foaming ingredients, etc.) under pressure from the reservoir 104 through the manifold 41 and out of the spray orifices 101 which are arrayed above the eggs 11 advancing through the washer 1 via the conveyors 2. The cleaning water is then filtered and recycled through the pumps 102 a number of times until it becomes unusable when it is changed.

From the washers 1, as previously mentioned, the eggs 11 are advanced by the conveyor 2 through a respective pair of egg candlers 13 in which light is directed through them and they are inspected for defects. From each of the candlers 13, the conveyor rollers 3 proceed onto respective ones of the inclined ramps 14 and 15 from which they are loaded onto the lower and upper egg breaker/separator units 23 and 22, respectively, of the egg breaking and separating apparatus 21.

III. Egg Breaking and Separating Apparatus

To reiterate, with reference to FIG. 1, the egg breaking and separating apparatus 21 is mounted on the four sided frame 25 and includes the upper and lower breaker/separator units 22 and 23, respectively. Each of the breaker/separator units 22 and 23 comprises an endless chain of egg cracking/ separating cup assemblies 24 with the upper and lower chains driven about the frame 25 in opposing directions.

Referring to FIG. 9, the breaking and separating apparatus 21 is shown in plan view without the chains of egg cracking/ separating cup assemblies 24 attached to illustrate the shape of the frame 25 and the shape of the path which each chain takes about the frame 25. A front or loading side 105 of the apparatus 21 is longer than an opposite rear side 111, which means that the remaining sides 112 and 113 taper inward from front to back. This shape has proven to be optimum for minimizing the floor space required to be occupied by a plurality of adjacent machines since the inward taper of the sides 112 and 113 leaves space for upper and lower operators (not shown) to be stationed on respective sides of each of the apparatuses 21 without additional separation between them. In FIG. 9, only one of the egg breaker/separator units 22 and 23 is shown, but both are essentially identical in size and configuration, so only the upper breaker/separator unit 22 will be described in detail.

Figure 20:
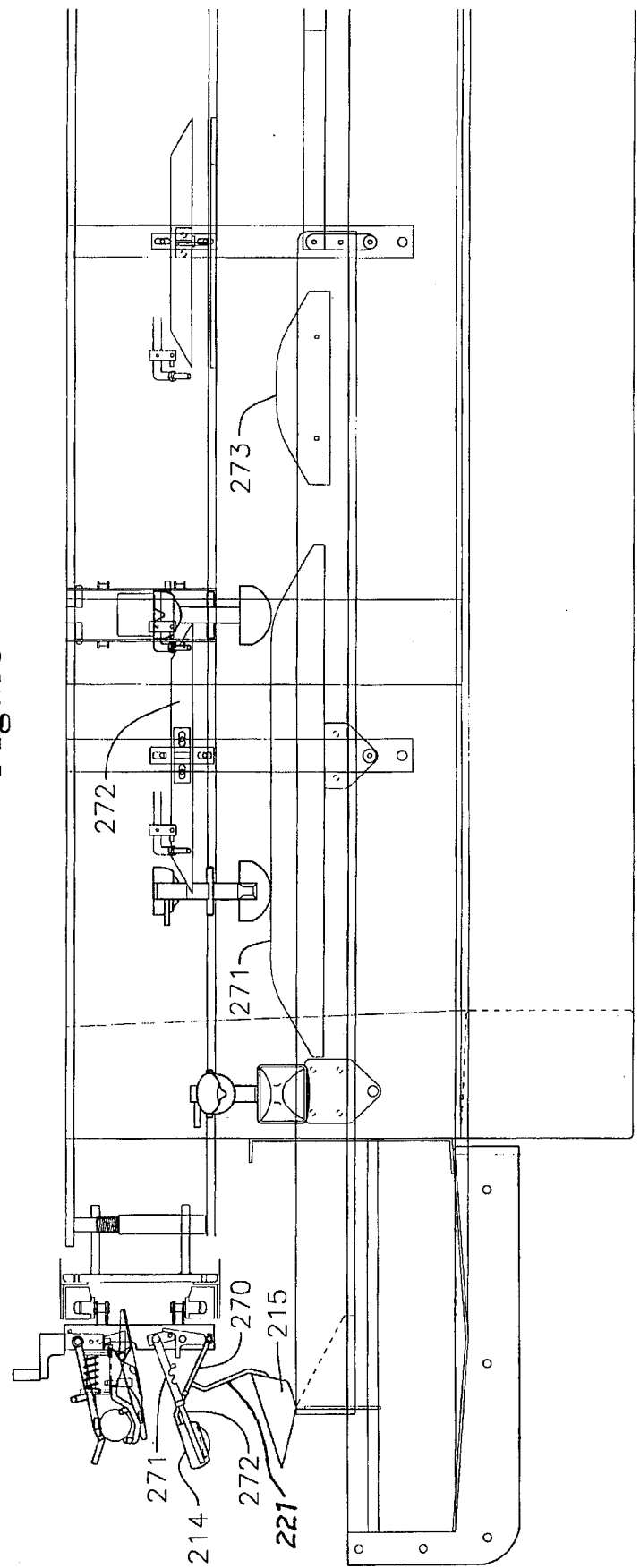
FIG. 20 is an enlarged, partial and partially schematic side elevational view of the egg cracking and shell separating stations of the lower egg breaker/separator unit.
Figure 21:
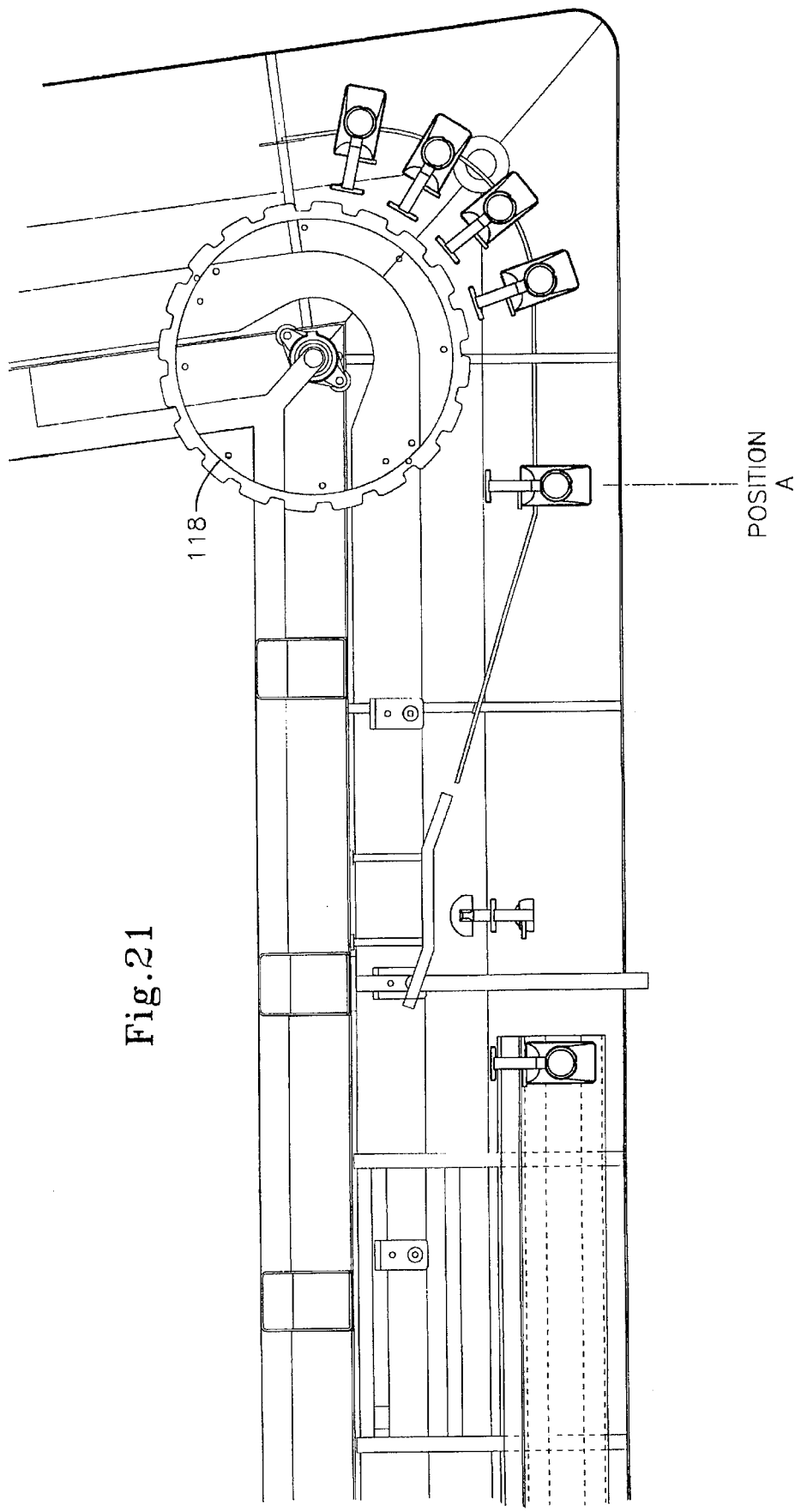
FIG. 21 is an enlarged, partial and partially schematic top plan view of the loading side of the lower egg breaker/separator unit.

The breaker/separator units 22 include a drive sprocket 114 at one front corner thereof which is chain driven via a drive chain 115 connected to the drive motor 31 and motor sprocket 117. A matching idler sprocket 118 is positioned at the other front corner. Each of the sprockets 114 and 118 is inserted into the frame 25 via a respective slot 119, which allows the sprockets and attached shafts, bearings, etc. (not shown) to be easily removed from the frame 25. In this manner, entire sprocket assemblies can be removed for service but replaced by spares so that minimal down time is required. A pair of considerably larger idler sprockets 121 and 122 are positioned at respective ones of the rear corners, also inserted, and therefore easily removable, via slots 119. A plurality of chain engaging track sections 123 are attached to each side of the frame 25 via attachment arms 124. Referring to FIG. 20, each of the track sections 123 comprises an upper track portion 125 and an inverted lower track portion 126. The sprockets 114, 115, 121 and 122 have relatively large diameters and are thus designed to minimize the incremental angles at which the chain of cracker/separator cup assemblies 24 make the turn from one side of the frame 25 to the next. This minimizes the centrifugal force exerted on eggs being carried by the cracker/separator cup assemblies 24 which greatly reduces the problem of eggs flying off of the assemblies 24 while negotiating the frame corners. For example, a preferred diameter for the front sprockets 114 and 118 is approximately 20 inches while the rear sprockets 121 and 122 are approximately 36 inches in diameter.

Referring to FIGS. 12–17, the transition of rows of eggs between the conveyors rollers 3 and the egg cracker/separator cup assemblies 24 will now be described. It should be noted that these figures illustrate a transition shuttle assembly 130 which transfers eggs 11 between the downwardly sloping ramp 14 and the lower egg breaker/separator unit 23. Since the upper transition shuttle assembly would simply be a mirror image thereof, it has not been separately illustrated.

Figure 12:
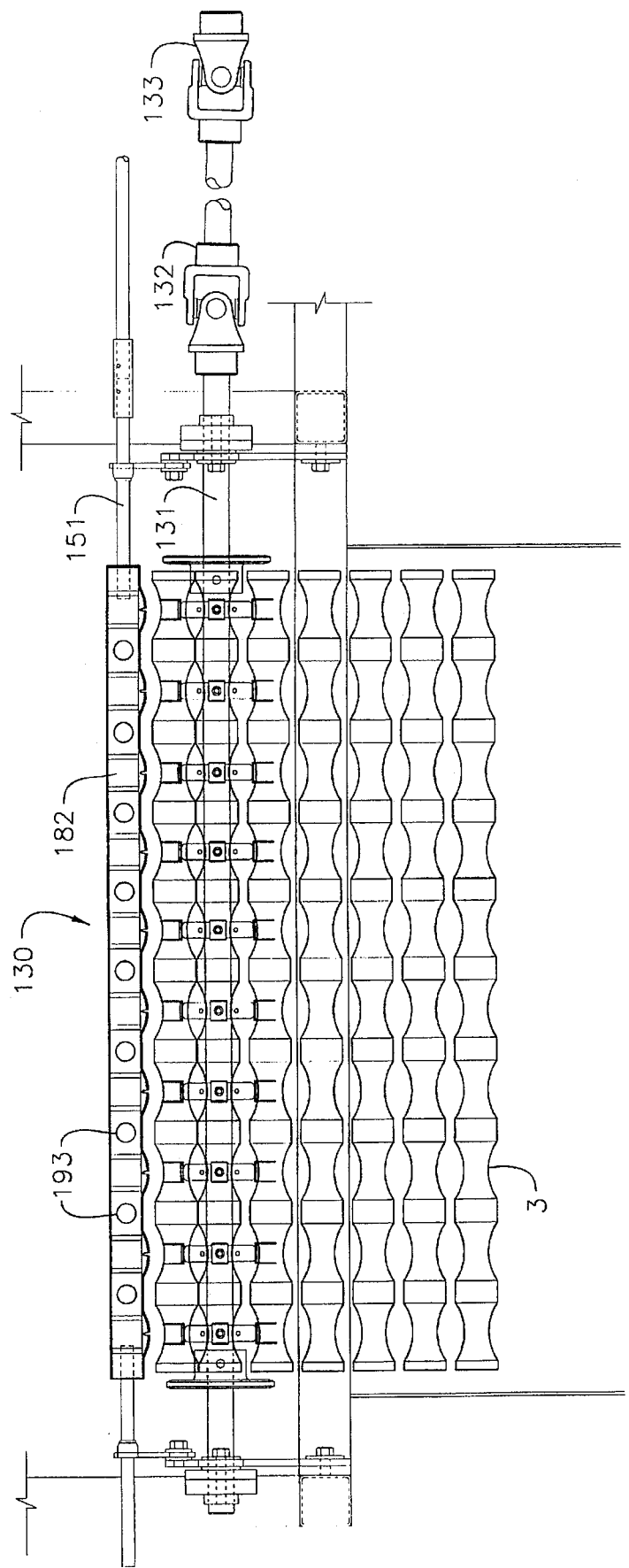
FIG. 12 is an enlarged, partial and partially schematic top plan view of an input portion of the lower egg breaker/separator unit with a portion of the egg conveyor, conveyor drive shaft and egg transfer shuttle and bar illustrated.
Figure 16:
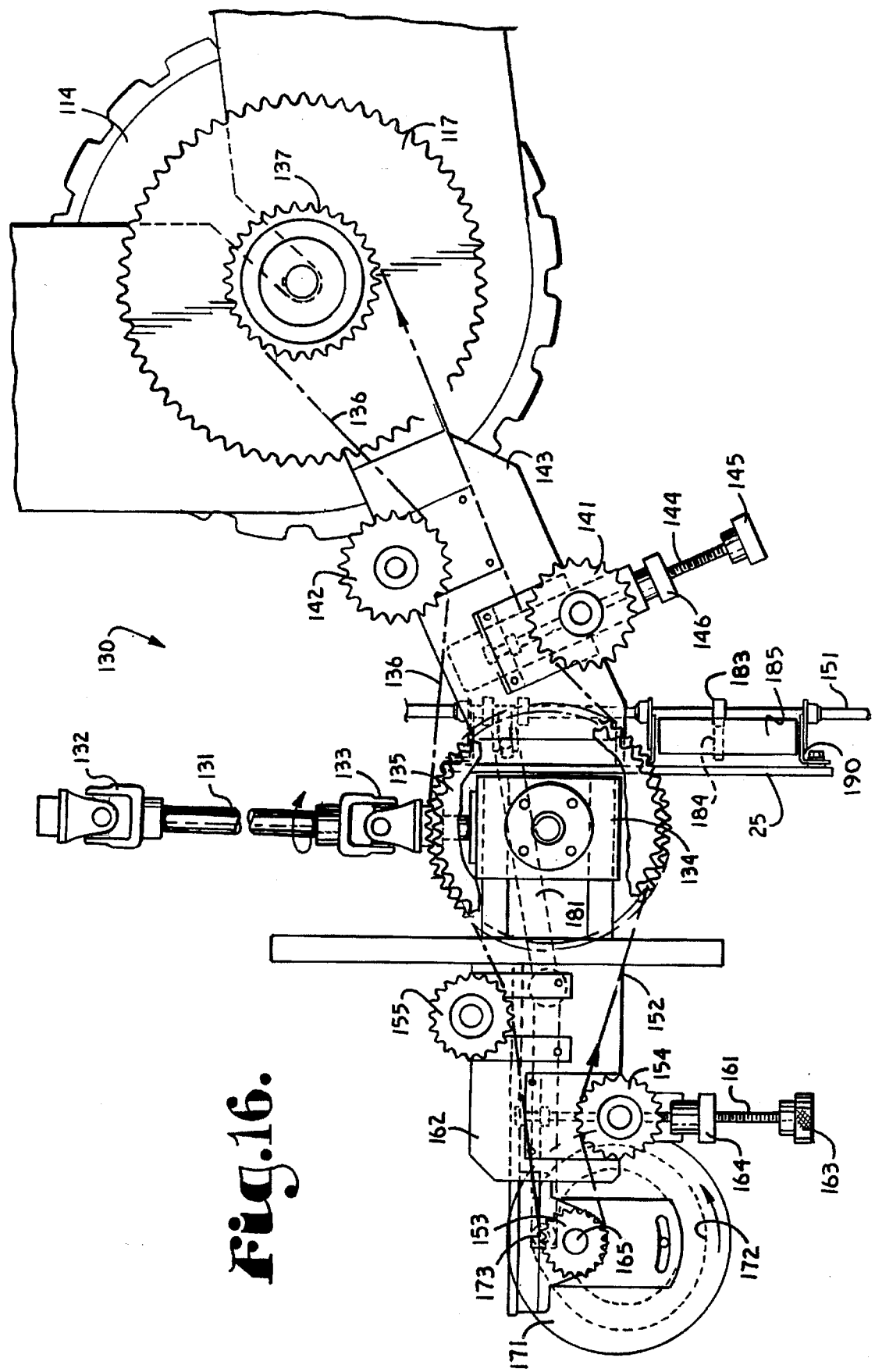
FIG. 16 is an enlarged top plan view of a conveyor and transfer shuttle bar drive and adjustment mechanism, with portions illustrated in phantom lines.
Figure 17:
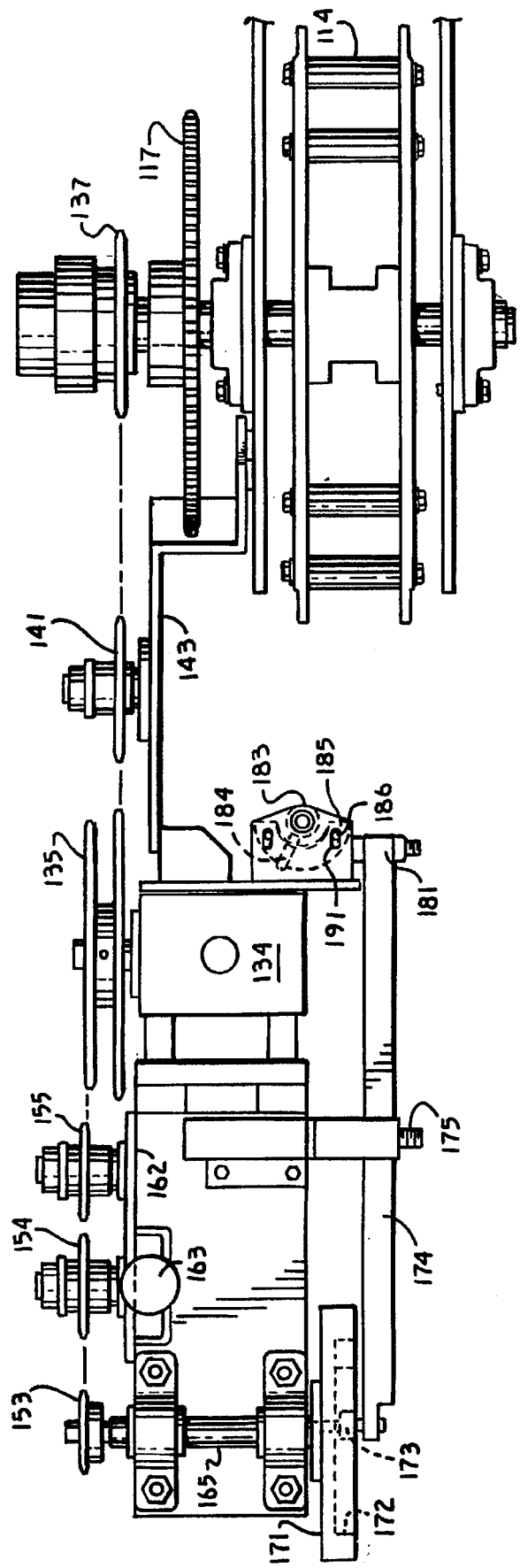
FIG. 17 is an enlarged side elevational view of the conveyor and transfer shuttle bar drive and adjustment mechanism of FIG. 16.
Figure 18:
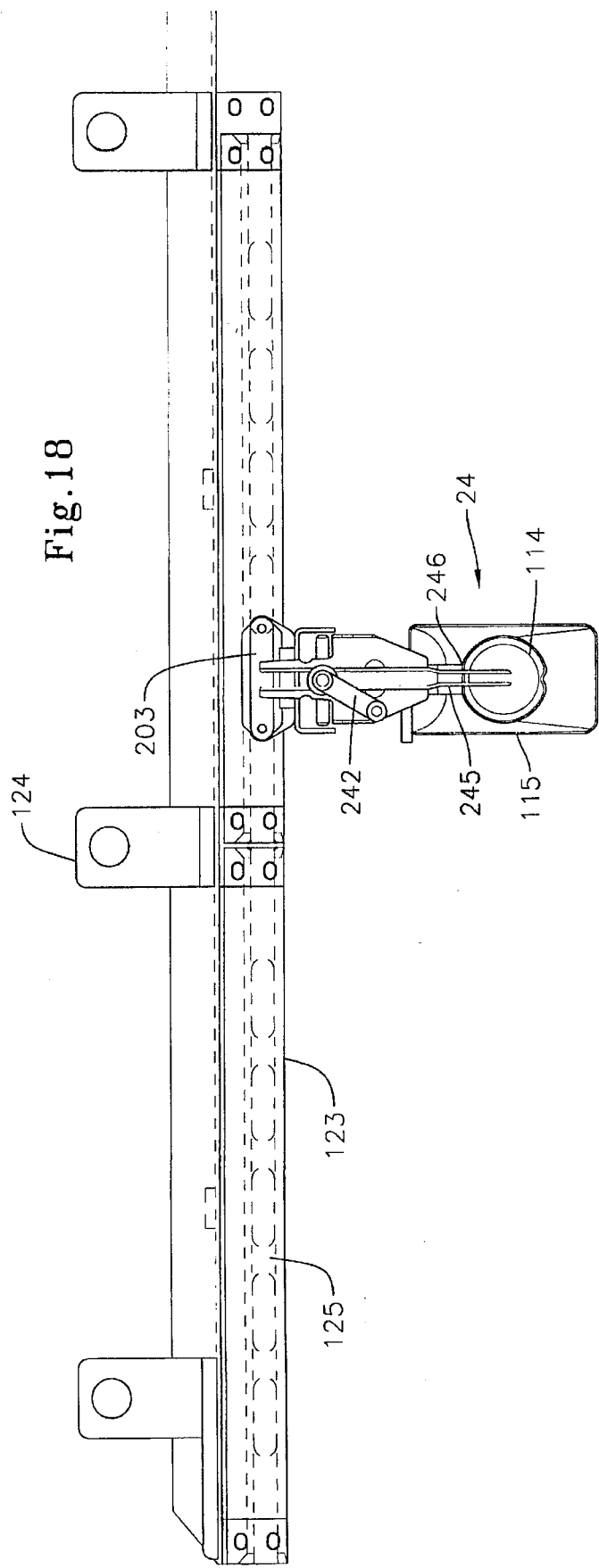
FIG. 18 is an enlarged, partial top plan view of a portion of a conveyor track from one of the egg breaker/separator units, showing a single egg cracker/separator cup assembly with its top slider engaged in the upper track portion which is shown in phantom lines.

In FIG. 12, the conveyor 2 including a plurality of the egg rollers 3, is shown encircling a conveyor drive shaft 131. The conveyor drive shaft includes a pair of universal joints 132 and 133, and is driven by a gear box 134 connected to the bottom sprocket on a double sprocket 135 which is driven by a chain 136 (FIGS. 16 and 17). The chain 136 is, in turn, driven by a sprocket 137 attached to the main drive sprocket 114 of the lower egg breaker/separator unit 23. A pair of tensioning sprockets 141 and 142 are attached to a movable plate 143 and are positioned to engage the chain 136. The plate 143 is selectively movable via a threaded adjustment screw 144 with a twist knob 145 and a set knob 146. By moving the plate 143 via the adjustment knob 145, the lengths of chain 136 on either side of the sprocket 135 are changed relative to each other. This has the effect of adjusting the relative positions of a shuttle bar 151 and the chain of egg cracker/separator cup assemblies 24, as well as the rotary position of the conveyor drive shaft 131, as will be explained below.

Figure 15:
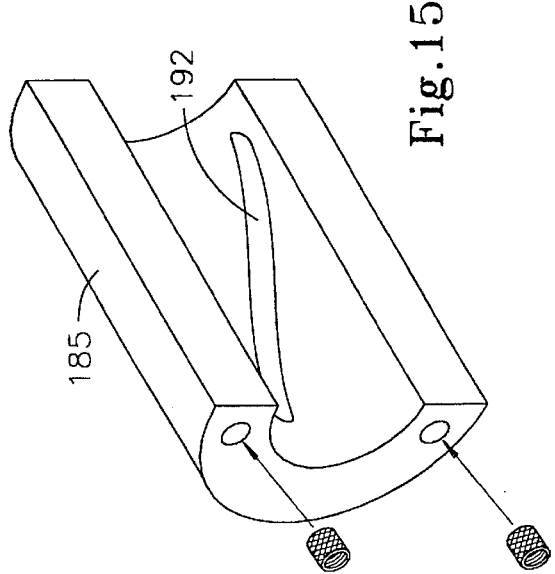
FIG. 15 is a greatly enlarged, perspective view of one of a rotation sleeve for one of the egg transfer shuttle bars.

Referring to FIGS. 16 and 17 again, a second drive chain 152 is driven by the top sprocket of the double sprocket 135 with the other end of the chain 152 being looped around a cam operating sprocket 153. A pair of tensioning sprockets 154 and 155 are positioned on respective sides of the chain 152 between the drive sprocket 135 and the cam sprocket 153. A second adjustment screw 161 is connected to a movable plate 162 to which are attached the tensioning sprockets 154 and 155. The tensioning screw 161 also has an adjustment knob 163 and a position set knob 164. Again, by adjusting the position of the tensioning screw 161, the lengths of chain 152 on either side of the cam sprocket 153 are adjusted relative to each other. This adjustment has the effect of adjusting the rotary position of the cam sprocket 153. The cam sprocket 153 turns a shaft 165 which is eccentrically attached to a rotary cam 171. The shaft 165 thus eccentrically rotates the rotary cam 171 which has an oblong cam groove 172 (shown in phantom lines) machined into its bottom side. A cam follower 173, also shown in phantom lines, follows the cam groove 172 as the cam 171 rotates about the shaft 165 and thus drives one end of an oscillating arm 174 in and out. The arm 174 thus pivots back and forth about a center pivot point 175, which drives an opposite end 181 of the arm 174 in and out. The opposite arm end 181 is, in turn, pivotally attached to the shuttle bar 151 and thus drives the bar 151 in and out. Referring again to FIG. 12, as well as to FIGS. 16 and 17, as the shuttle bar 151 is moved in and out, an egg transfer shuttle 182, attached to the bar 151 near one end thereof, is driven to and fro relative to the conveyor rollers 3. Near the opposite end of the shuttle bar 151 is attached a collar 183 with a pin 184 protruding tangentially therefrom. A half sleeve 185, which is better illustrated in FIG. 15, is fixedly attached to a portion of the frame 25 via set screws 186 and brackets 190. With the set screws operating in slots 191 in the brackets 190, the relative rotary positions of the half sleeve 185 and the shuttle bar 151 are somewhat adjustable. A spiral slot 192 is cut through the half sleeve 185 and is sized to accommodate the pin 184 therein. Thus, as the bar 151 is driven in and out, the pin 184 is driven through the spiral slot 192, thus gradually rotating the bar 151 through an approximately 90 degree angle. As the bar 151 is rotated, eggs 11 which have been loaded onto receiving depressions 193 in the transfer shuttle 182 from the conveyor rollers 3, are then tipped out of the transfer shuttle 182 and into egg receiving cradles 194 of corresponding ones of the egg cracking/separating cup assemblies 24. The moving shuttle bar 151 thus has the effect of accelerating the rows of eggs from a standing start as they drop from the conveyor rollers 3 onto the transfer shuttle 182, to a speed equal to the speed of the cracking/separating cup assembly chain.

The eggs 11 thus drop from the conveyor rollers 3 onto the shuttle 182 via gravity, and the eggs 11 then drop from the shuttle 182 into the respective egg cradles 194 in the assemblies 24 via gravity. Since the fall rate of the eggs 11 is a constant, in order to gain proper synchronization between the conveyor rollers 3 and the shuttle 182, and between the shuttle 182 and the cradles 194 at varying speeds of operation, their relative positions must be adjustable. Thus, referring again to FIGS. 12, 16 and 17, when the speed of operation of the lower breaker/separator unit 23 is increased, the shuttle egg depressions 193 in the shuttle 182 must be positioned in advance of the cradles 194 when the eggs 11 are tipped out so that they fall into the respective cradles 194 with the proper timing. Of course, when operating speeds are slowed, the shuttle egg depressions do not need to be as far advanced for proper synchronization. The problem is illustrated somewhat schematically in FIG. 13, which shows the path which must be traversed by eggs 11 from the conveyor 2 to the cradles 194 of each cracker/separator cup assembly 24. By loosening the set knob 164 (FIGS. 16 and 17) and adjusting the adjustment screw 161 via the knob 163, the rotary position of the cam 171 is adjustable. This then has the effect of adjusting the in and out position (and the rotary position) of the shuttle bar 151 relative to both the conveyor rollers 3 and the chain of cracker/separator cup assemblies 24, which allows the synchronization to be adjusted "on the fly", i.e. as the system is running. Similarly, by adjusting the position of the adjustment screw 144 via the knob 145, the position of the plate 143 is adjusted. This turns the sprocket 135, simultaneously changing both the rotary position of the conveyor drive shaft 131, and thus the position of the egg conveyor rollers 3, and the in and out and rotary position of the shuttle bar 151. With this adjustment, the timing of egg deliveries from the conveyor 2 to the shuttle 182 and the relative timing of both the conveyor 2 and the egg shuttle 182 versus the chain of egg cracker/separator cup assemblies 24 are adjusted, which can also be done on the fly. This ability to completely adjust the entire shuttle assembly 130 while the egg washing, breaking and separating system is running represents a significant advance in operating efficiency from prior art systems which typically needed to be shut down entirely for any timing adjustments to be made. This requirement resulted in many wasted eggs as the adjustment was a trial and error type method and, of course, much lost time as the system was repeatedly shut down and restarted during adjustment.

It should be noted that the eggs 11 are shuttled from the conveyor rollers 3 near one end of the longer loading side 105 of the frame 25. Furthermore, the side from which they are shuttled on both the upper and lower egg breaker/separator units 22 and 23 are chosen such that the egg cracker/separator cup assemblies must transit the entire remainder of the loading side 105 before they reach the drive sprocket (114 in the case of the lower unit 23) and must negotiate the first corner of the frame 25. This rather long straight run which the egg cracker/separator assemblies 24 must make after they are loaded but before they reach the first corner allows adequate settling time for the eggs 11 to cease rocking and to firmly settle into the respective cradles 194. Thus, losses due to unstable eggs 11 flying off of their cradles 194 as they transit the drive sprocket 114 are minimized.

Figure 19:
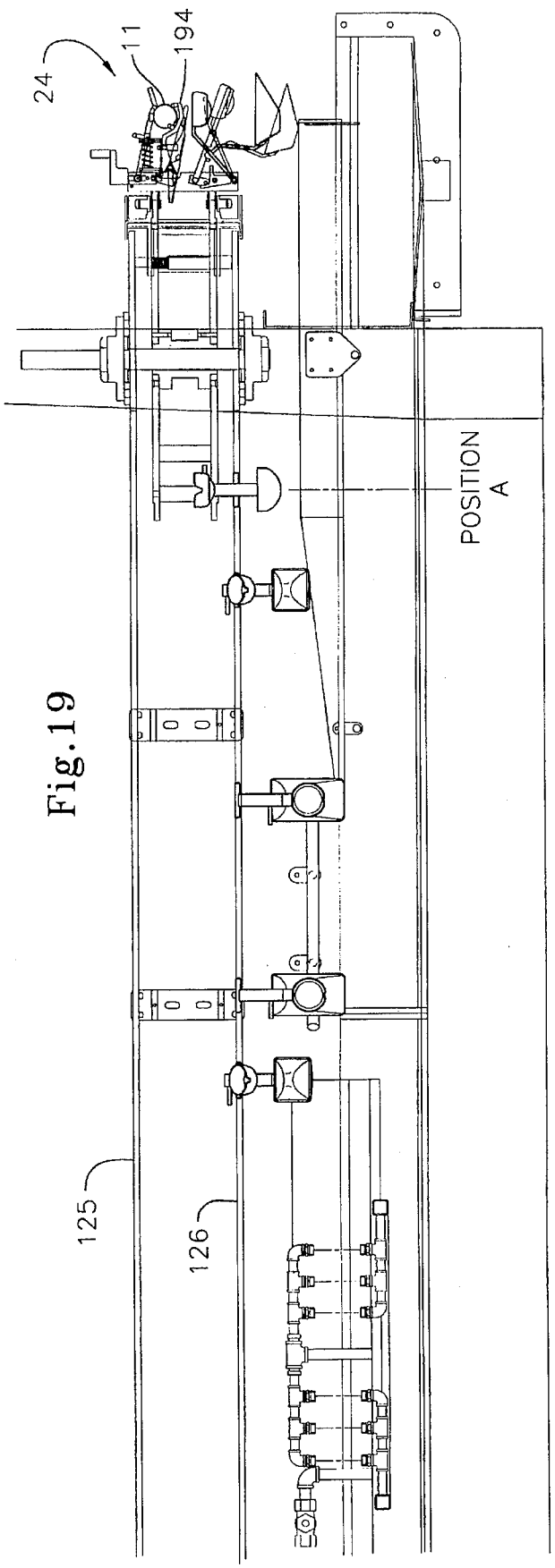
FIG. 19 is an enlarged, partial and partially schematic side elevational view of a front or loading side of the lower egg breaker/separator unit
Figure 23:
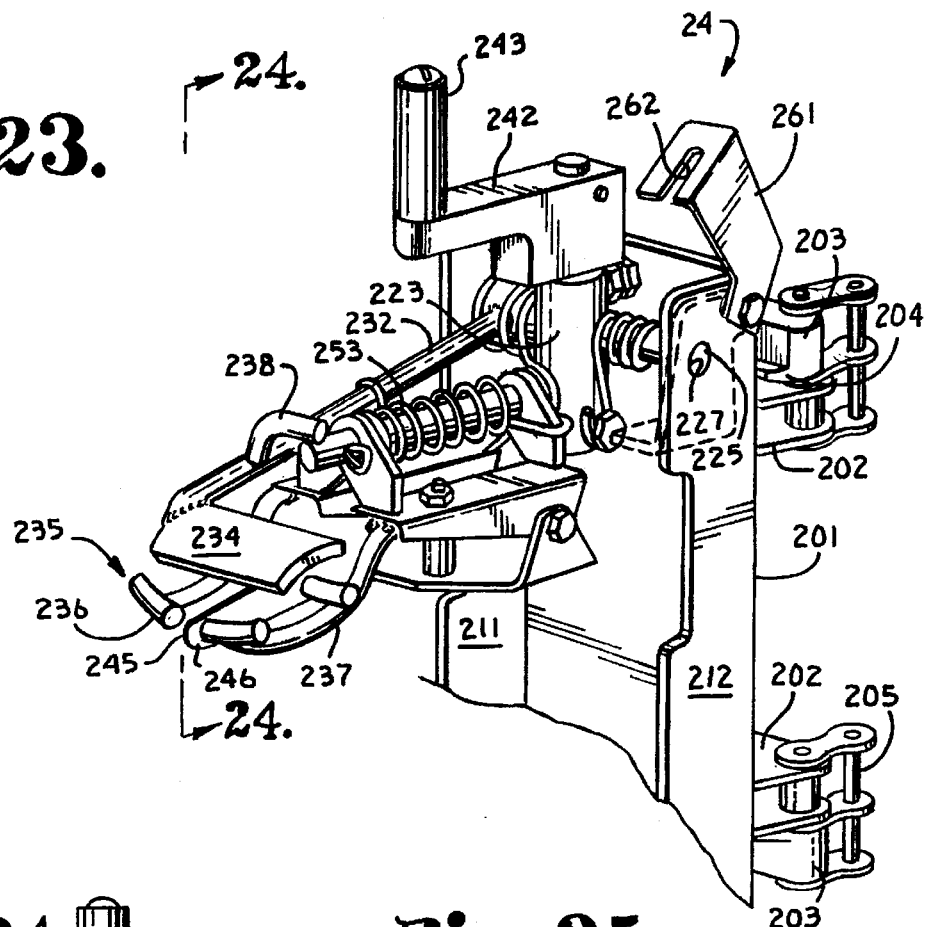
FIG. 23 is a greatly enlarged, partial perspective view of one of the egg cracker/separator cup assemblies with its egg cradle cam operator centered, with an egg cracker retaining guard in a retaining position in phantom lines and in an release position in solid lines, and illustrating the top and bottom sliders and attached double chain links.
Figure 24:
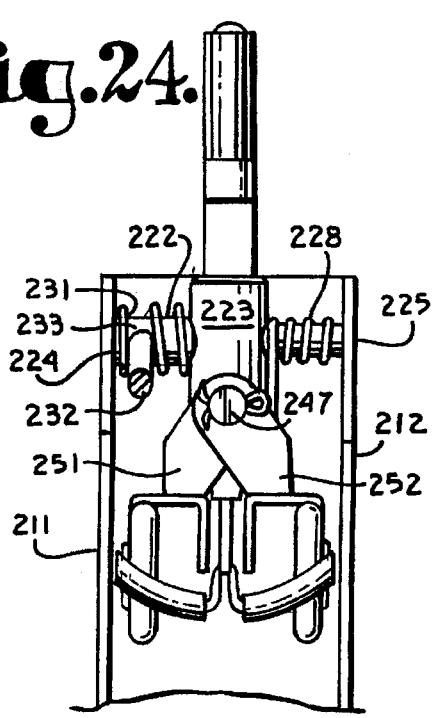
FIG. 24 is a greatly enlarged, partial, and partially schematic front elevational view of the egg cracker/separator cup assembly taken along line 24—24 of FIG. 23, with its egg cradle cam operator centered.
Figure 25:
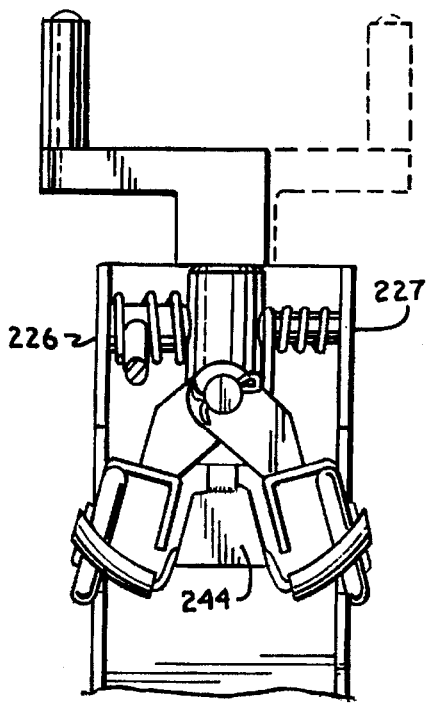
FIG. 25 is a greatly enlarged, partial, and partially schematic front elevational view of the egg cracker/separator cup assembly of FIG. 23, with its egg cradle cam operator illustrated as moved to the left in solid lines, and to the right in phantom lines, operating the cam to separate the cradle halves in either position.

In FIGS. 23–25, portions of a single one of the egg cracker/separator cup assemblies 24 is illustrated. Each assembly 24 includes a backplate 201, to the rear of which are attached upper and lower elongate chain links 202, which are mounted as mirror images of each other. Attached to each of the elongate chain links 202 is a slider 203, which, in cross-section is T shaped. The sliders 203 are designed to slide within respective ones of the upper and lower track portions 125 and 126, as shown schematically in FIG. 19, with a short leg 204 of the T abutting the respective track portion 125 or 126. The use of the sliders 203 and tracks 123 has greatly improved the reliability and tracking of the endless chains of assemblies 24 over prior art roller systems such as were used in the '056 patent. As previously mentioned, roller based systems such as the '056 patent required constant replacement of rollers and related parts, resulting in increased costs and expensive machine down time as the parts are replaced. Attached to either side of each combination elongate chain link 202 and slider 203 is a pair of double short chain links 205, of which only one is shown in FIG. 23. The links 205 are connectable to the combination elongate chain link 202 and slider 203 of the adjacent assembly 24 on either side of this assembly 24, etc. until an endless chain of assemblies 24 is created which is of a length sufficient to feed through the respective track sections 123 and reach around the drive and idler sprockets 114 and 118, 121 and 122, as explained above. It should be noted that both the sliders 203 and the track portions 125 and 126 have been constructed of both stainless steel and plastic, and the materials can be used interchangeably with good results.

The back plate 201 is actually U shaped in cross section with two shorter legs 211 and 212 of the U forming side walls for the assembly 24. Each of the sidewalls 211 and 212 has a number of apertures drilled therethrough for mounting of various components. Since an egg separating cup 214 (FIG. 20) and egg white receiving tray 215 and supporting bar 221 are entirely conventional, they have been eliminated from FIGS. 23–25 for added clarity.

Referring again to FIGS. 23–25, a shaft 222 extends outward on either side of a vertically oriented central sleeve 223 with first and second ends of the shaft 224 and 225, respectively, extending through respective upper apertures 226 and 227 in the respective sidewalls 211 and 212. A coil spring 228 surrounds the shaft 222 on the right side and a coil spring 231 surrounds the shaft 222 on the left side. The springs 228 and 231 exert force against the front of the backplate 201 and against the inside of each sidewall 211 and 212 to center the shaft 222 and hold it in position. In addition, the left coil spring 231 exerts downward pressure against an egg holddown arm 232. The holddown arm 232 ends at one end thereof in a sleeve 233 which encircles the shaft 222 and is rotatable relative thereto and, in the other end in a curved plate member 234 which normally exerts downward pressure against an egg lying in a cracking cradle 235 made up of separable cradle halves 236 and 237. The holddown arm 232 has attached thereto a cam rail engaging member 238 which is adapted to engage a cam rail (FIG. 19) to raise the holddown arm 232 to thereby allow an egg 11 to be deposited in the cradle 235 by the shuttle 182, as will be more fully explained below.

The vertical sleeve 223 surrounds a shaft (not shown) which is attached at an upper end to a cam operator 242 equipped with a roller 243. The bottom end of the shaft terminates in a triangular cam 244 which is shaped such that, when the cam operator 242 is moved either direction from center by the roller 243, the triangular cam is pivoted through 90 degrees to forcibly separate the cradle halves 236 and 237 as well as a pair of spring loaded egg cracker knives 245 and 246 which are attached to the cradle halves 236 and 237, respectively. The cradle halves 236 and 237 are attached to a center shaft 247 which protrudes outward from the sleeve 223 via respective pairs of pivot arms 251 and 252. A coil spring 253 surrounds the shaft 247 and is attached at respective ends thereof to the rear pivot arm 252 of the right cradle half 237 and the front pivot arm 251 of the left cradle half 236. The spring 253 acts to urge the cradle halves 236 and 237, along with the respective attached egg cracker knives 245 and 246 toward each other. The egg cracker knives 245 and 246 are pivotable with respect to the respective cradle halves 236 and 237 such that they can be operated by a cam rail to release and be pulled upward into contact with the egg 11 via springs (not shown), as will be more fully explained below.

The entire assembly of the shaft 222 with the attached cam operator 242 and cam 244, the holddown arm 232, and the cradle 235 with attached cracker knives 245 and 246 is removable from the backplate 201 by urging the shaft 222 to the right, forcing the fight shaft end 224 to protrude through the aperture 227 and allowing the left shaft end 225 to drop out of the aperture 226. Since the cracker/separator cup assemblies 24 must be operable in either direction due to the counter rotation of egg breaker/separator units 22 and 23, a pivotable guard 261 is attached to the sidewall 212. The guard 261 includes a slot 262 which fits over the front of the sidewall 212 in a down position in which the guard 261 covers the aperture 227. In this position, the right end 225 of the shaft 222 cannot protrude past the aperture 227 and the shaft 222 cannot be removed. This prevents the motion of the cracker/separator cup assemblies 24 when they are moving to the left from causing the shaft 222 to accidentally dislodge from the associated backplate 201. When the shaft 222 is to be removed, the guard 261 is pivoted upward, as shown in phantom lines, thus allowing the shaft end 225 to protrude past the sidewall 212 when urged to the right, and releasing the left shaft end 224.

Figure 10:
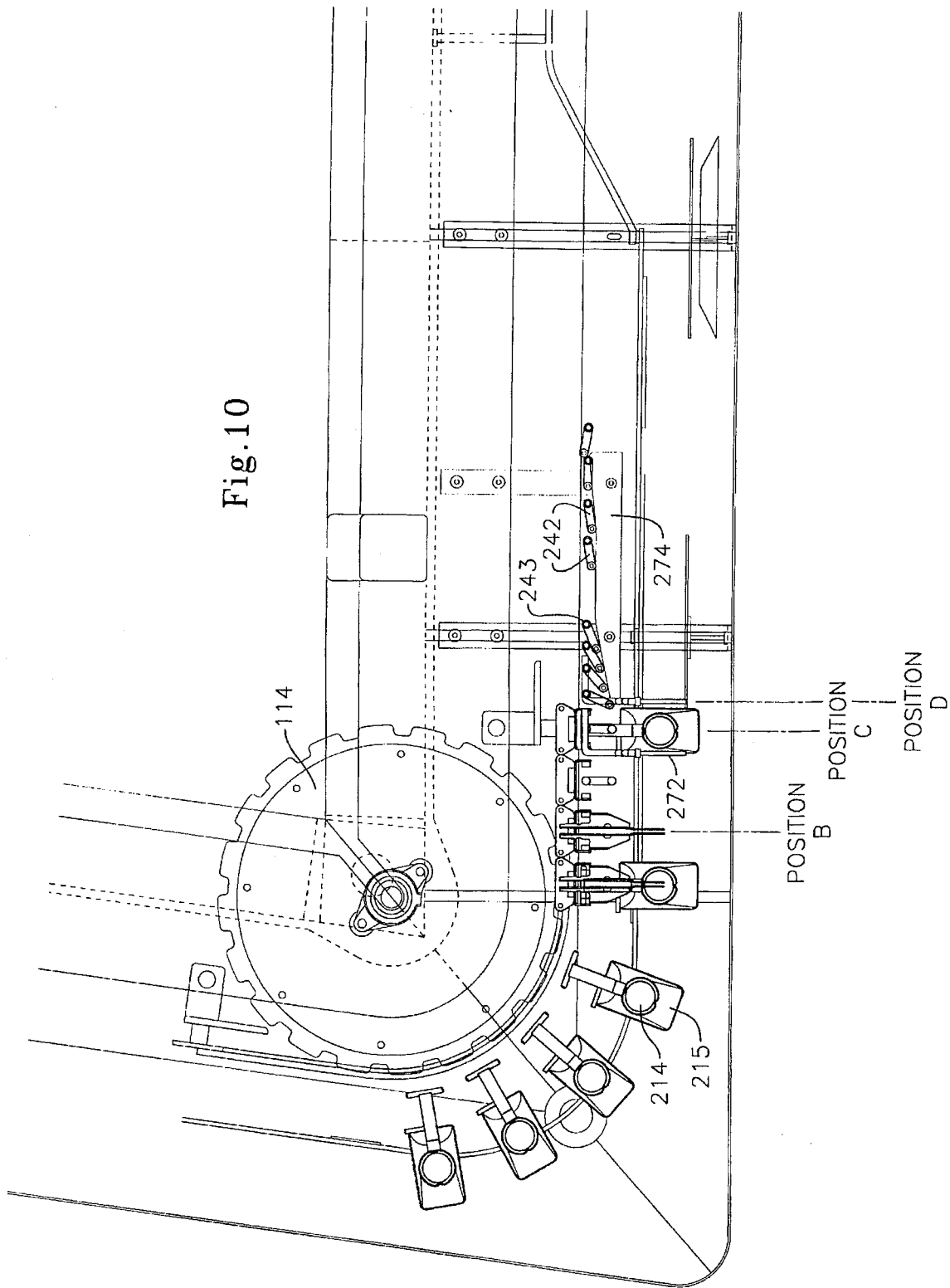
FIG. 10 is an enlarged, partial and partially schematic view of the lower egg breaking/separating unit, illustrating egg cracking and shell separating positions thereon.
Figure 13:
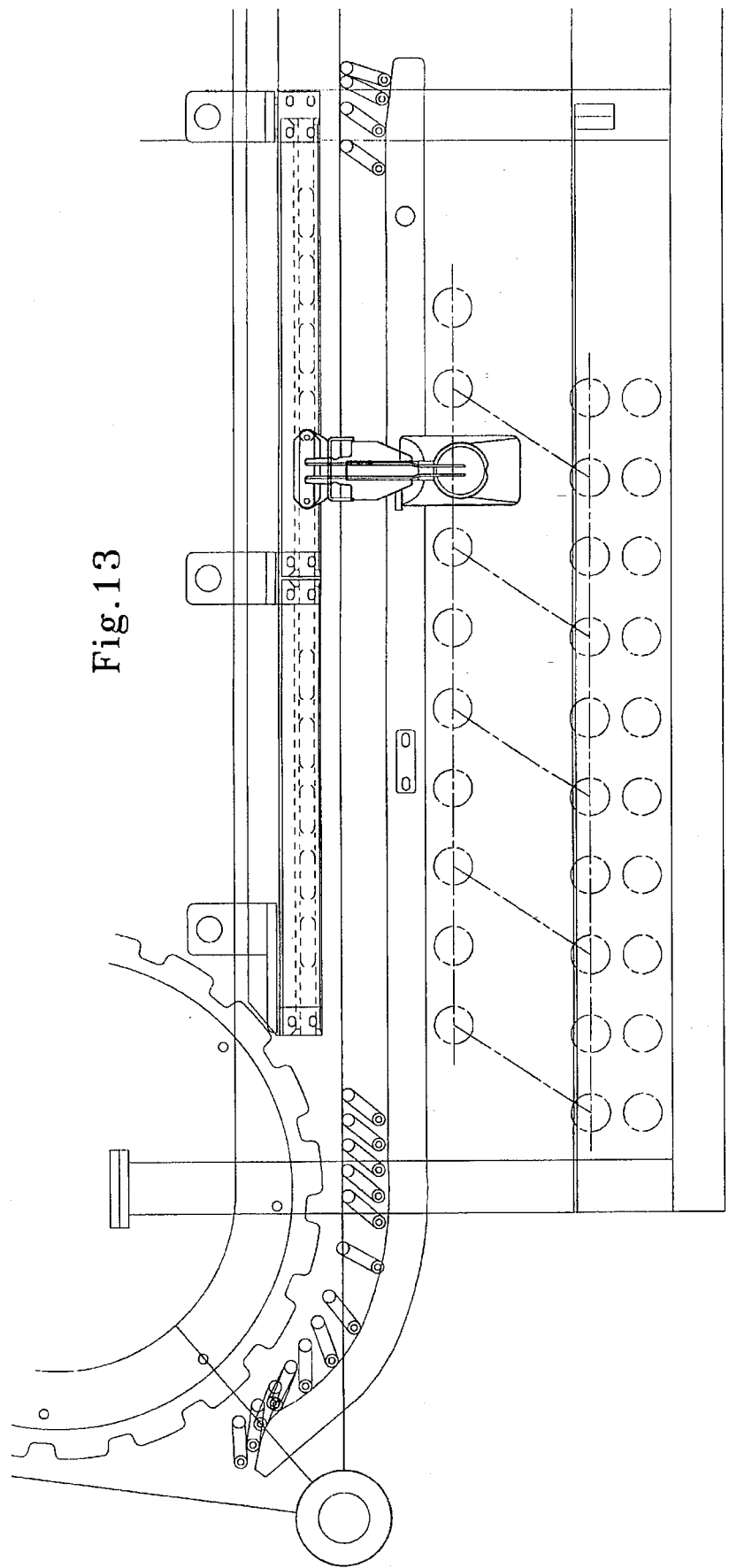
FIG. 13 is an enlarged, partial and partially schematic top plan view of the input portion of the lower egg beaker/separator unit with eggs, shown in phantom lines, being transferred from the conveyor to the egg cracker/separator cup assemblies.
Figure 14:
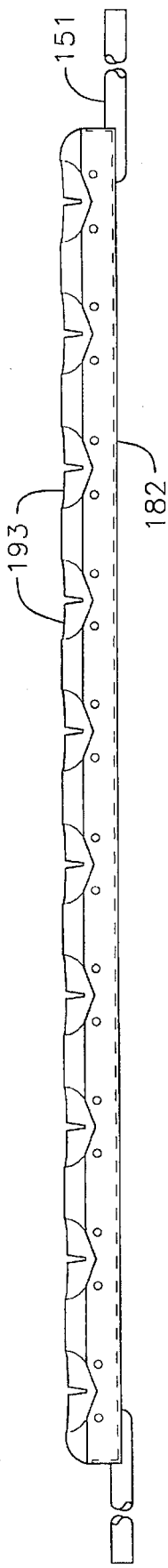
FIG. 14 is an enlarged, side elevational view of one of the egg transfer shuffle trays attached to a portion of an egg shuttle bar.

With reference to FIGS. 10–12 and 19–22, a complete cycle of an egg cracker/separator cup assembly 24 will now be briefly described. Referring first to FIGS. 12 and 13, as has been previously described, eggs 11 are loaded onto cradles 235 of each cup assembly 24 by the shuttle 182 as they are pulled past the conveyor 2. As the cup assemblies 24 reach a point labeled "Position A", (FIGS. 19 and 21) the combination tray and separator cups 215 and 214, which are interconnected, have been urged upward and have had a cup support arm 270 locked into place via lower slot 271 in a movable cup trip arm 272 (FIG. 20). At this point, the cracker knives 245 and 246 are being urged down by a cracker knife cam (not shown). Just after the assemblies 24 have turned the first corner past the drive sprocket 114 and reached Position B, as shown in FIGS. 10 and 20, the cracker knives 245 and 246 are released from the knife cam, with the knife springs 254 urging the knives 245 and 246 upward and into the egg 11, cracking the egg shell. At position C, the cup 214 and tray 215 are urged upward by a cam rail 273 (FIG. 10) so that the cup 214 is positioned to receive the contents of the cracked egg shell. At position D, the cradle cam operator 242 and roller 243 is urged to the left by a cam rail 274 (FIG. 10), so that the cam 244 separates the cradle halves 236 and 237 as well as the cracker knives 245 and 246 so that the contents of the egg 11 can completely drain into the separating cup 214. From Position D, the cup assemblies 24 make a complete cycle around the rear side 111 of the frame 25 while the separating cup 214 retains the egg yolk and allows the egg white to drain into the tray 215.

Figure 11:
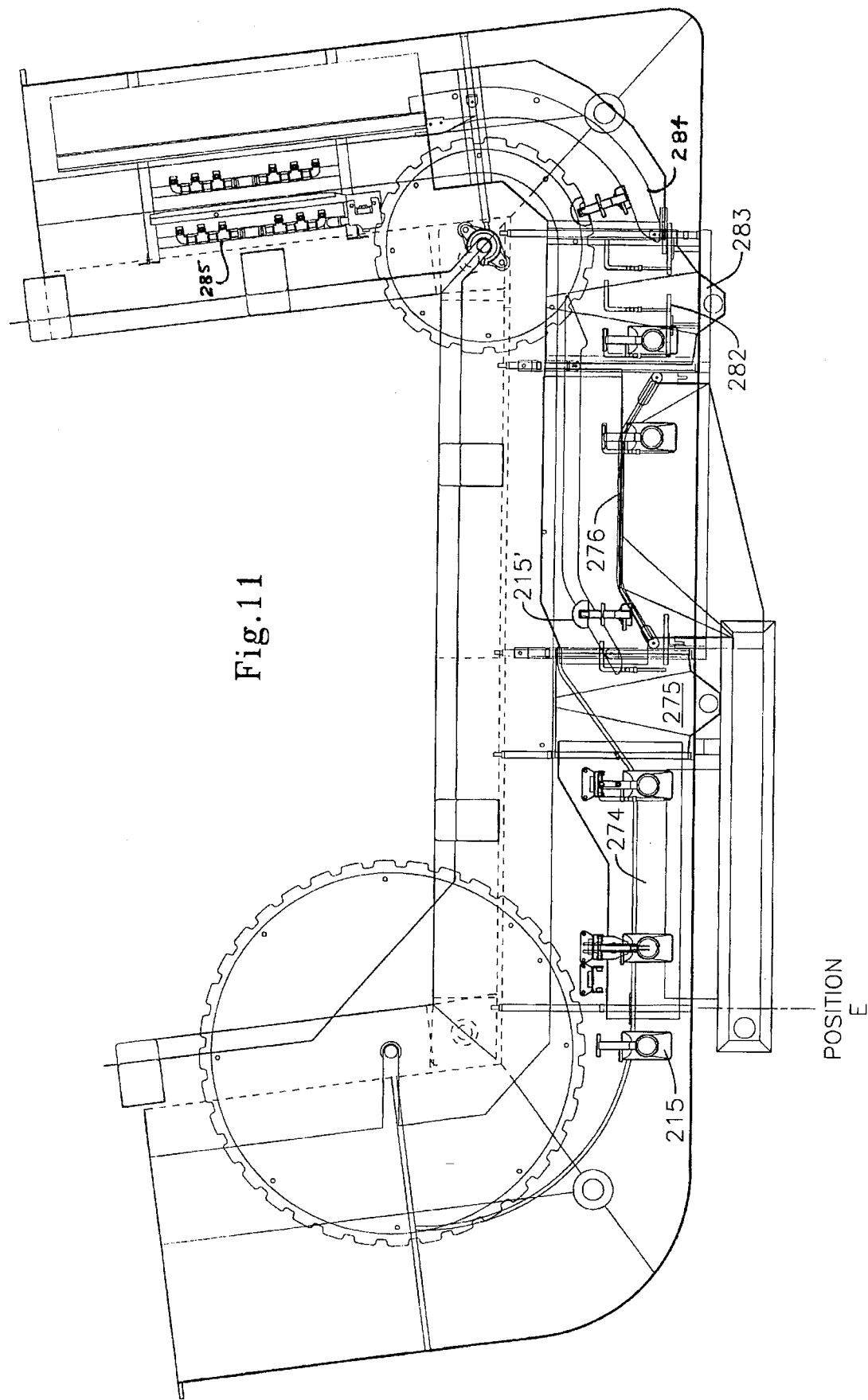
FIG. 11 is an enlarged, partial and partially schematic view of an operator station and return side of one of the egg breaker/separator drives.
Figure 22:
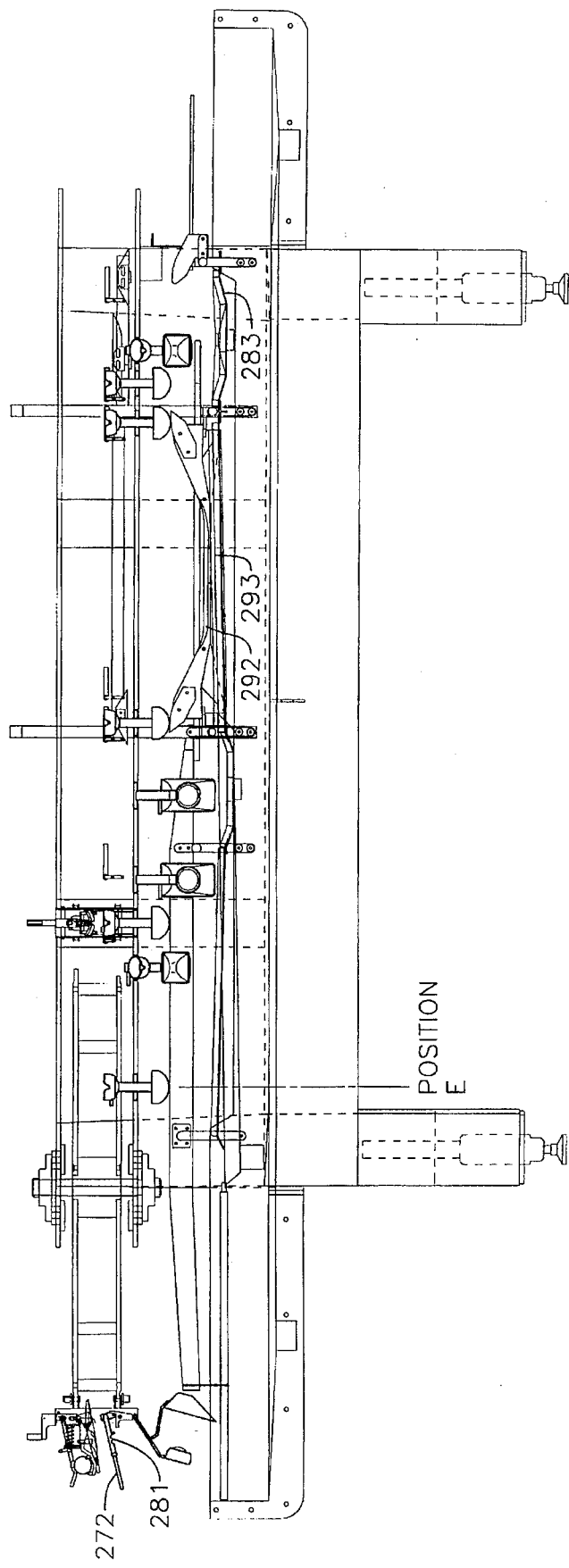
FIG. 22 is an enlarged, partial and partially schematic side elevational view of the operator's station and return side of the lower breaker/separator unit.

Referring to FIGS. 11 and 22, at Position E, an operator (not shown) observes the separated eggs in the assemblies 24 to determine whether any egg yolks have broken and drained into the trays 215 (a "whole egg"), in which case he lifts the trip arm 272 upward, causing the tray 215 and the cup 214 to ride along the top of a cam rail 274 and then to fall off and dump their contents into a whole egg receiving tray 275. The thus dropped tray 215 and cup 214 are thus diverted by a cam 276, as illustrated by the inverted tray 215'.

By contrast, if the operator detects an inedible egg, e.g. a contaminated or rotten egg, he lifts the tray 215 upward until the second slot 281 in the trip arm 272 grips the cup arm 270. This causes the tray 215 to be raised above the top surface of the cam 276, thus bypassing this cam surface and engaging a cam surface 282 which trips the trip arm 272 and drops the inedible egg into an inedible trough 283. From their dropped positions, both the whole egg and the inedible egg trays 215 and cups 214 are diverted behind a double rail 284 and into a wash assembly 285 where they trip a spray nozzle trigger which sprays them with water prior to repeating the cycle.

Finally, in the event that the cracked and separated egg is normal, the operator at Position E takes no action, allowing the trip arm 272 to be tripped by a cam rail 291, dropping the contents of the cup 214 into a yolk receiving trough 292 and the contents of the tray 215 into an egg white receiving trough 293 positioned below the yolk receiving trough 292 (FIG. 22).

The current improved egg washing, breaking and separating system can be installed in a production facility in a manner in which two of the inventive systems replace three prior art systems, achieving a 50% increase in egg throughput and efficiency while utilizing 10 people to operate instead of 12. The system is designed to be integrated with a high speed mechanized egg loader, and the entire integrated system can be controlled by single programmable logic controller (not shown).

It is to be understood that while certain forms of the present invention have been illustrated and described herein, it is not to be limited to the specific forms or arrangement of parts described and shown.

What is claimed and desired to be secured by Letters Patent is as follows:

1. An egg breaker/separator comprising:
   (a) a support frame;
   (b) an upper endless chain with a plurality of cracker/separator cup assemblies connected thereto and spaced from one another along said upper chain, said upper chain extending around said frame;
   (c) a lower endless chain with a plurality of cracker/separator cup assemblies connected thereto and spaced from one another along said lower chain, said lower chain extending around said frame;
   (d) attachment means for slidably attaching said upper and lower endless chains to said frame;
   (e) upper drive means for driving said upper chain about said frame; and
   (f) lower drive means for driving said lower chain about said frame, said upper and lower drive means being independent of each other;
   (g) each of said cracker/separator cup assemblies comprising:
      (i) an egg cradle with separable halves; and
      (ii) cracking means for cracking an egg cradled in said egg cradle.

2. An egg breaker/separator as in claim 1, wherein:
   (a) said frame has at least two sides with one side being a loading side.

3. An egg breaker/separator as in claim 2, and further comprising:
   (a) a pair of egg loading shuttles, a first of which is positioned alongside said upper chain near one end of said loading side for loading eggs onto said upper chain of cup assemblies, the second shuttle being positioned alongside said lower chain near a second end of said loading side for loading eggs onto said lower chain of cup assemblies.

4. An egg breaker/separator as in claim 3, wherein:
   (a) each of said egg loading shuttles is positioned to accept rows of eggs from an egg conveyor, each said shuttle further comprising:
      (i) an egg receiving tray with a number of egg receptacles equal to the number of eggs in each row of said conveyor;
      (ii) a rotatable shaft supporting said egg receiving tray;
      (iii) shuttle drive means attached to said shaft for moving said shaft and attached receiving tray in the same direction as the respective chain of cup assemblies; and
      (iv) adjustment means for adjusting the relative position between the egg receiving tray and the respective cup chain.

5. An egg breaker/separator as in claim 4, and each said shuttle further comprising:
   (a) rotating means for rotating said shaft comprising:
      (i) a collar surrounding and connected to said shaft;
      (ii) a pin extending outward from said collar;
      (iii) a stationary sleeve surrounding a portion of said shaft including said collar, said sleeve including a spiral slot extending through a wall thereof and positioned to engage said pin.

6. An egg breaker/separator as in claim 1, wherein:
   (a) said attachment means comprises:
      (i) upper and lower track means attached to said frame;

(ii) a plurality of slider means attached to each cracker/ separator cup assembly, each said slider means being adapted to fit and slide within a respective one of said track means.

7. An egg breaker/separator as in claim 6, wherein:
   (a) each of said upper and lower track means includes two spaced tracks and each of said slider means includes upper and lower sliders spaced to fit within respective ones of said spaced tracks.

8. An egg breaker/separator as in claim 7, wherein each of said upper and lower endless chains comprises a plurality of chain links, and wherein:
   (a) each of said upper and lower sliders is attached between a respective pair of said chain links, said upper and lower chains being formed of linked sliders and attached cup assemblies.

9. An egg breaker/separator as in claim 8, wherein:
   (a) the upper and lower sliders and attached chain links on each said cup assembly form mirror images of each other.

10. An egg breaker/separator as in claim 7, wherein:
    (a) at least one of said spaced tracks and at least one of said sliders is made of a plastic material.

11. An egg breaker/separator as in claim 1, wherein:
    (a) each of said cracker/separator cup assemblies includes cam means for urging said separable halves apart, said cam means having a spring urged central position at which said separable halves are together and left and right positions, said cam means being operable upon movement in either said left or said right direction from said central position to separate said egg cradle halves.

12. An egg breaker/separator as in claim 11 wherein:
    (a) said egg cradle and said cam means in each of said cracker/separator cup assemblies are removably attached to a backplate with a pair of sidewalls, said cam means including a shaft which fits within apertures on both said sidewalls of said backplate and a spring surrounding said shaft which exerts a force against each said sidewall, causing said shaft to center between said sidewalls, said cracker/separator cup assembly also comprising a pivotable plate positioned adjacent to and outside of one of said sidewalls, said plate being pivotable between a first position which covers a respective one of said apertures and thereby blocks the removal of said cradle and cam means from each said backplate and a second position which uncovers said respective aperture and thereby allows said cradle and cam means to be removed from said backplate.

13. A combination egg washer, cracker and separator system comprising:
    (a) a pair of egg washers, with each of said egg washers comprising:
       (i) an egg conveyor for conveying rows of eggs in a first direction over a surface, said egg conveyor having first and second sides;
       (ii) cleaning fluid distributing means for spraying cleaning fluid on said conveyor;
       (iii) a plurality of endless chains of interlocking brushes disposed above said conveyor with each said chain being oriented transverse to said first direction, each said brush including a plurality of bristles;
       (iv) brush drive means for driving each of the endless chains of brushes in a respective loop such that the brushes are moved in a direction transverse to said first direction and the bristles in said interlocking brushes contact eggs on said conveyor as they are driven through a bottom portion of said loop;
    (b) an egg breaker/separator comprising:
       (i) a support frame;
       (ii) an upper endless chain with a plurality of cracker/ separator cup assemblies connected thereto and spaced from one another along said upper chain, said upper chain extending around said frame;
       (iii) a lower endless chain with a plurality of cracker/ separator cup assemblies connected thereto and spaced from one another along said lower chain, said lower chain extending around said frame;
       (iv) attachment means for slidably attaching said upper and lower endless chains to said frame;
       (v) upper drive means for driving said upper chain about said frame; and
       (vi) lower drive means for driving said lower chain about said frame;
       (vii) each of said cracker/separator cup assemblies comprising:
          (1) an egg cradle with separable halves; and
          (2) cracking means for cracking an egg cradled in said egg cradle; and wherein
    (c) a first of said egg conveyors conveys rows of eggs to said lower endless chain of egg cracker/separator cup assemblies and a second of said egg conveyors conveys rows of eggs to said upper endless chain of egg cracker/separator cup assemblies.

14. A system as in claim 13, wherein each said brush drive means comprises:
    (a) a pair of drive shafts, with one shaft arrayed above each of said first and second sides of said conveyor, said drive shafts being driven in respective counter rotating directions; and
    (b) a plurality of sprockets attached to and extending around each said drive shaft, with each said sprocket on each shaft being attached to a respective one of said endless brush chains, said sprockets on each shaft alternating between drive sprockets and idler sprockets such that each brush chain loop is driven in a direction counter to a brush chain loop immediately on either side.

15. An egg washer as in claim 13, wherein each said cleaning fluid distributing means comprises:
    (a) a source of cleaning fluid;
    (b) a fluid pump connected to said source;
    (c) a fluid manifold connected to said pump, said manifold including:
       (i) a main distributing tube with a plurality of tube receiving openings;
       (ii) a plurality of closed end spraying tubes removably connectable to respective ones of said openings to extend outward from said main distribution tube and above the respective egg conveyor, each of said spraying tubes including a plurality of spray orifices facing said conveyor; and
    (d) means for removably holding said spraying tubes connected to said respective openings and in place above said conveyor.

16. An egg washer as in claim 13, wherein each said egg conveyor comprises:
    (a) a plurality of egg receiving rollers positioned to roll along said surface beneath said brush chains, each said roller being connected between a pair of endless chains which are driven in a loop which extends along said surface and then back beneath said surface to a point of beginning; and
    (b) a belt positioned beneath said rollers along said surface, said belt being in contact with each said roller as it transits said surface, said belt extending in a loop positioned inside the loop formed by said chains and extending between said endless chains, said belt being driven in a direction opposite to the direction of said endless chains to accelerate the rotation of said rollers as they roll along said surface.

17. An egg washer as in claim 13, wherein each said brush chain comprises:

(a) a plurality of brush receiving plates, each plate having a pair of opposite ends with an extension at one end thereof and a slot sized to receive an extension of an adjacent plate at the opposite end thereof, each said extension having a clevis attached thereto, and each said slot having a pair of clevises on either side thereof whereby said plates are interlocking with the extension of one plate being insertable in the slot of the next plate, each said plate including a plurality of bristle receiving cavities; and (b) pin means for insertion in clevises of each pair of adjoining brush plates to thereby pivotally attach said plates together to form said endless chain.

18. A system as in claim 13, wherein:

(a) said frame has at least two sides with one side being a loading side.

19. A system as in claim 18, and further comprising:

(a) a pair of egg loading shuttles, a first of which is positioned alongside said upper chain near one end of said loading side for loading eggs onto said upper chain of cup assemblies, the second shuttle being positioned alongside said lower chain near the opposite end of said loading side for loading eggs onto said lower chain of cup assemblies.

20. A system as in claim 19, wherein:

(a) each of said egg loading shuttles is positioned to accept rows of eggs from a respective one of said egg conveyors, each said shuttle further comprising:

(i) an egg receiving tray with a number of egg receptacles equal to the number of eggs in each row of said respective conveyor;

(ii) a rotatable shaft supporting said egg receptacles;

(iii) shuttle drive means attached to said shaft for moving said shaft and attached receptacle tray in the same direction as the respective chain of cup assemblies; and (iv) adjustment means for adjusting the relative position between the egg receiving tray and the respective cup chain.

21. A system as in claim 20, and each said shuttle further comprises:

(a) rotating means for rotating said shaft comprising:

(i) a collar surrounding and connected to said shaft;

(ii) a pin extending outward from said collar;

(ii) a stationary sleeve surrounding a portion of said shaft including said collar, said sleeve including a spiral slot extending through a wall thereof and positioned to engage said pin.

22. A system as in claim 13, wherein:

(a) each said attachment means comprises:

(i) upper and lower track means attached to said frame;

(ii) slider means attached to each cracker/separator cup assembly, each said slider means being adapted to fit and slide within a respective one of said track means.

23. A system as in claim 22, wherein:

(a) each of said upper and lower track means includes two spaced tracks and each of said slider means includes upper and lower sliders spaced to fit within respective ones of said spaced tracks.

24. A system as in claim 23, wherein each of said upper and lower endless chains comprises a plurality of chain links, and wherein:

(a) each of said upper and lower sliders is attached between a respective pair of said chain links, said upper and lower chains being formed of linked sliders and attached cup assemblies.

25. A system as in claim 24, wherein:

(a) the upper and lower sliders and attached chain links on each said cup assembly form mirror images of each other.

26. A system as in claim 23, wherein:

(a) at least one of said spaced tracks and at least one of said sliders is made of a plastic material.

27. A system as in claim 13, wherein:

(a) each of said cracker/separator cup assemblies includes cam means for urging said separable halves apart, said cam means having a spring urged central position at which said separable halves are together and left and right positions, said cam means being operable upon movement toward either said left or said right position from said central position to separate said egg cradle halves.

28. A system as in claim 27 wherein:

(a) said egg cradle and said cam means in each of said cracker/separator cup assemblies are removably attached to a backplate with a pair of sidewalls, said cam means including a shaft which fits within apertures on both said sidewalls of said backplate and a spring surrounding said shaft which exerts a force against each said sidewall, causing said shaft to center between said sidewalls, said cracker/separator cup assembly also comprising:

(i) a pivotable plate positioned adjacent to and outside of one of said sidewalls, said plate being pivotable between a first position which covers a respective one of said apertures and thereby blocks the removal of said cradle and cam means from said backplate and a second position which uncovers said respective aperture and thereby allows said cradle and cam means to be removed from said backplate.

* * * * *